(12) United States Patent
Liu et al.

(10) Patent No.: US 8,462,786 B2
(45) Date of Patent: Jun. 11, 2013

(54) EFFICIENT TCAM-BASED PACKET CLASSIFICATION USING MULTIPLE LOOKUPS AND CLASSIFIER SEMANTICS

(75) Inventors: Alex X. Liu, Okemos, MI (US); Chad R. Meiners, East Lansing, MI (US); Eric Torng, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 239 days.

(21) Appl. No.: 12/855,992

(22) Filed: Aug. 13, 2010

(65) Prior Publication Data
US 2011/0038375 A1    Feb. 17, 2011

Related U.S. Application Data

(60) Provisional application No. 61/234,390, filed on Aug. 17, 2009.

(51) Int. Cl.
*H04L 12/56* (2006.01)
(52) U.S. Cl.
USPC ............... 370/392; 370/389; 706/12; 726/11; 726/13; 726/14
(58) Field of Classification Search
USPC ............. 726/11–14; 703/1; 370/389, 392
See application file for complete search history.

(56) References Cited

U.S. PATENT DOCUMENTS

| | | | |
|---|---|---|---|
| 6,867,991 B1 * | 3/2005 | Tezcan et al. | 365/49.16 |
| 8,089,961 B2 * | 1/2012 | Sahni et al. | 370/389 |
| 2002/0065870 A1 * | 5/2002 | Baehr-Jones et al. | 709/201 |
| 2006/0015514 A1 * | 1/2006 | Suga | 707/100 |
| 2006/0218280 A1 * | 9/2006 | Gouda et al. | 709/226 |
| 2006/0277601 A1 * | 12/2006 | Gouda et al. | 726/11 |
| 2007/0016946 A1 * | 1/2007 | Gouda et al. | 726/11 |

OTHER PUBLICATIONS

A whitepaper titled "A Cross-Domain Privacy-preserving Protocol for cooperative Firewall Optimization", Chen et al, 2007.*
A whitepaper titled "Packet classifier in Ternary CAM can be smaller", Chen et al, 2006.*
A whitepaper titled "Packet classifier in multiple fields", Gupta et al, 1999.*
A whitepaper titled "TCAM-Based distributed parallel packet classification with range encoding", Kai et al, 2006.*
Dong et al. "Packet Classifier in ternary CAMs Can Be Smaller" 2006, the whole pages.*
Hadzic, "Cost Bounded Binary decision Diagrams for 0-1 Programming" Jun. 1, 2007, the whole pages.*
C. Meiners et al "Algorithmic Approaches to Redesigning TCAM-Based Systems" Sigmetrics'08 Jun. 2008.
P. Gupta et al "Packet Classification on Multiple Fields" Proceedings of thoe ACM SIGCOMM, 1999.
K. Zheng et al "DPPC-RE: TCAM-Based Distributed Parallel Packet Classification With Range Encoding" IEEE Transactions on Computers, 2006.

* cited by examiner

*Primary Examiner* — Dang T Ton
*Assistant Examiner* — Mewale Ambaye
(74) *Attorney, Agent, or Firm* — Harness, Dickey & Pierce, P.L.C.

(57) ABSTRACT

A method is provided for constructing a packet classifier for a computer network system. The method includes: receiving a set of rules for packet classification, where a rule sets forth values for fields in a data packet and a decision for data packets having matching field values; representing the set of rules as a directed graph; partitioning the graph into at least two partitions; generating at least one lookup table for each partition of the graph; and instantiating the lookup tables from one partition on a first content-addressable memory and the lookup tables from the other partition on a second content-addressable memory device.

11 Claims, 20 Drawing Sheets

| Single - lookup | |
|---|---|
| 001,001 | accept |
| 001,010 | accept w. log |
| 001,*** | discard |
| 010,001 | accept |
| 010,010 | accept w. log |
| 010,*** | discard |
| 100,001 | accept |
| 100,010 | accept w. log |
| 100,*** | discard |
| *,* | discard w. log |

*Fig-1A*

| $t_1$ | |
|---|---|
| 001 | $t_2$ |
| 010 | $t_2$ |
| 100 | $t_2$ |
| *** | $t_3$ |

| $t_2$ | |
|---|---|
| 001 | accept |
| 010 | accept w. log |
| *** | discard |

| $t_3$ | |
|---|---|
| *** | discard w. log |

*Fig-1B*

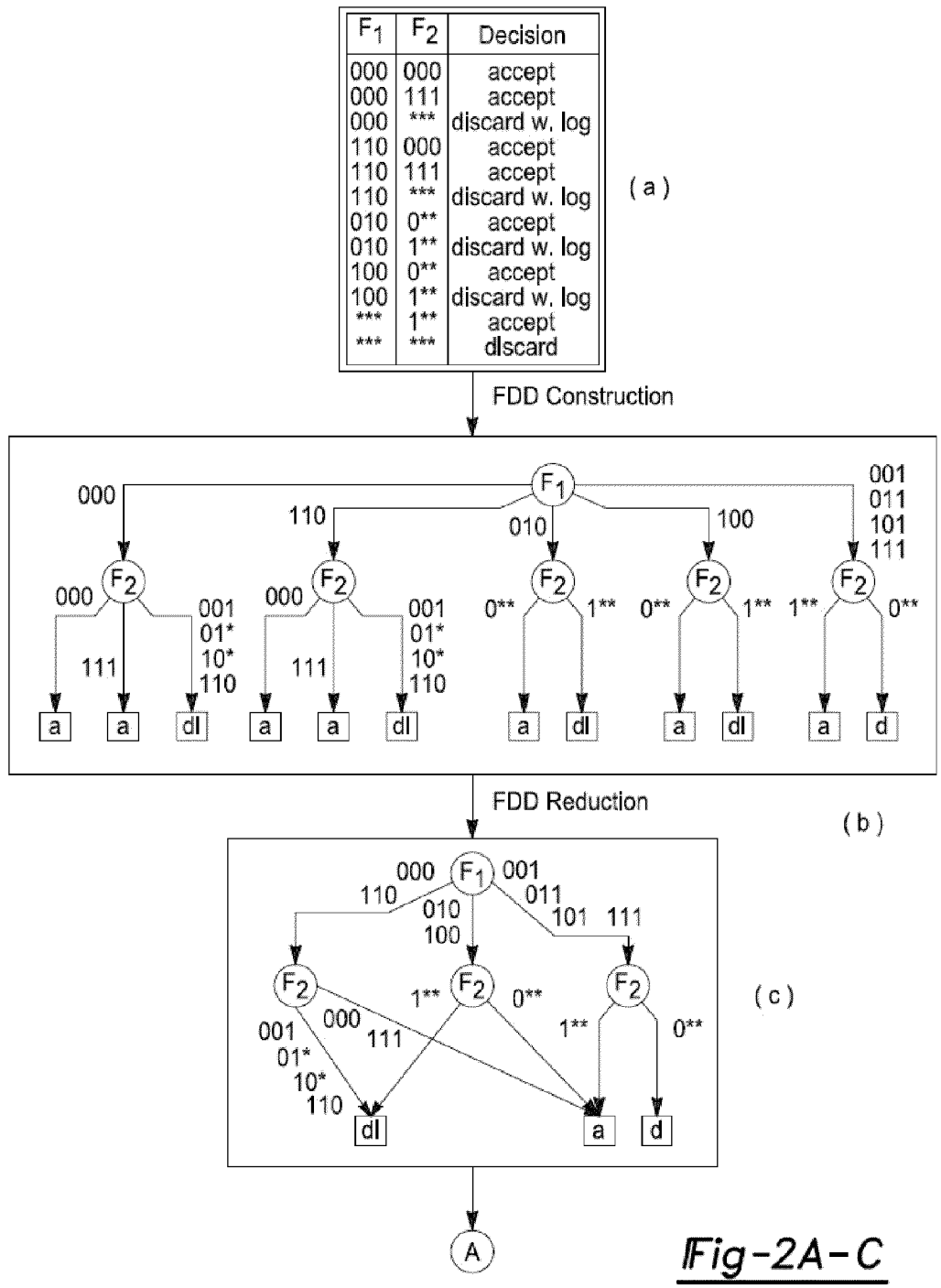
Fig-2A-C

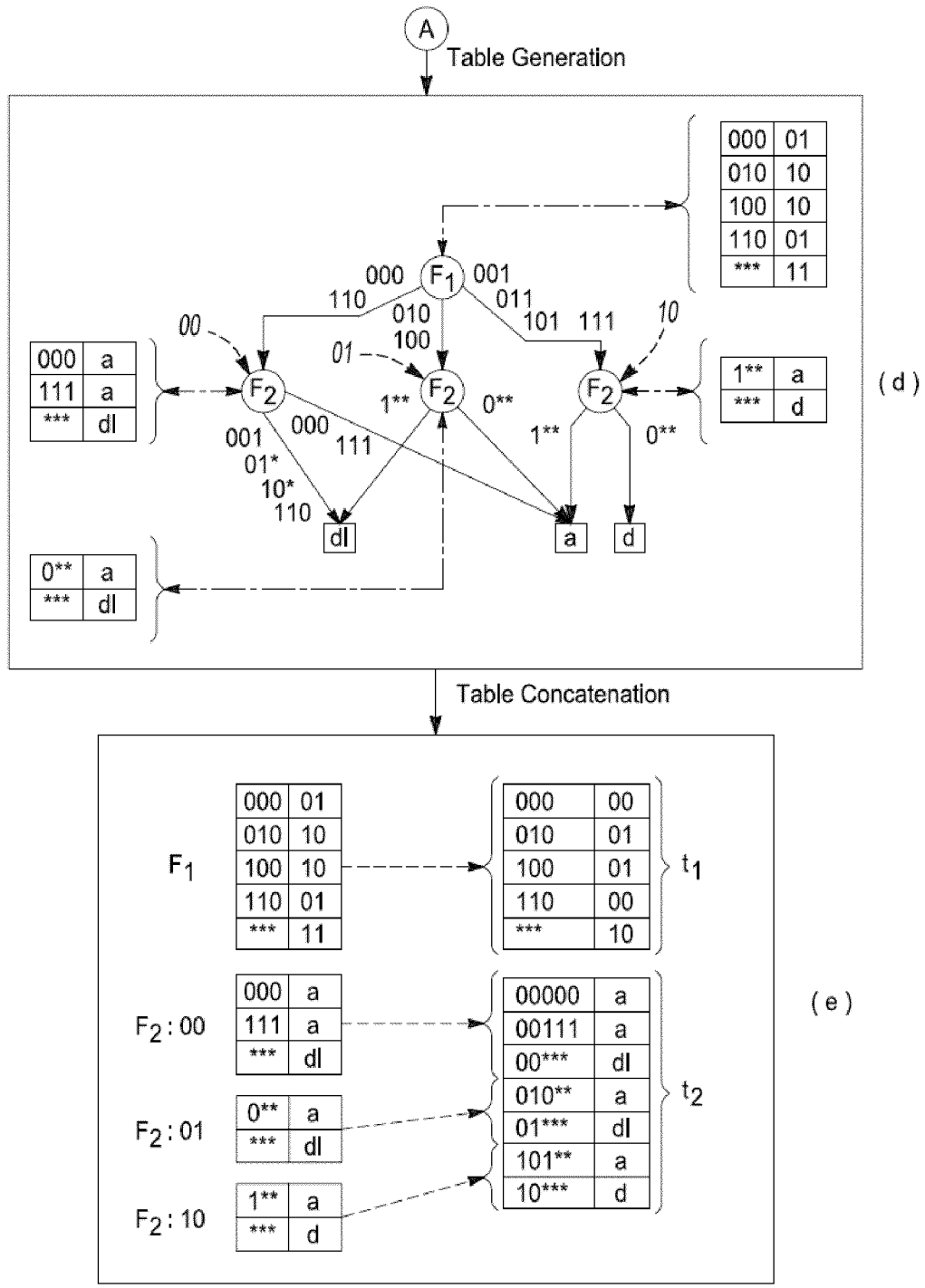
Fig-2D-E

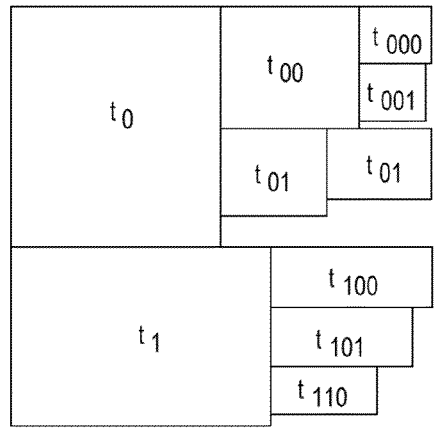 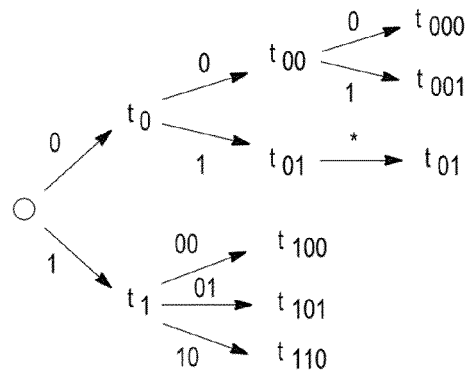
*Fig-6A*  *Fig-6B*
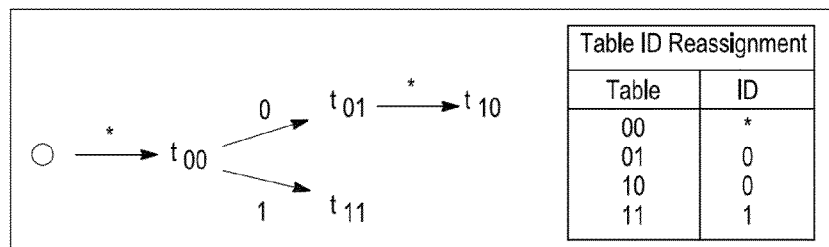
*Fig-7A*
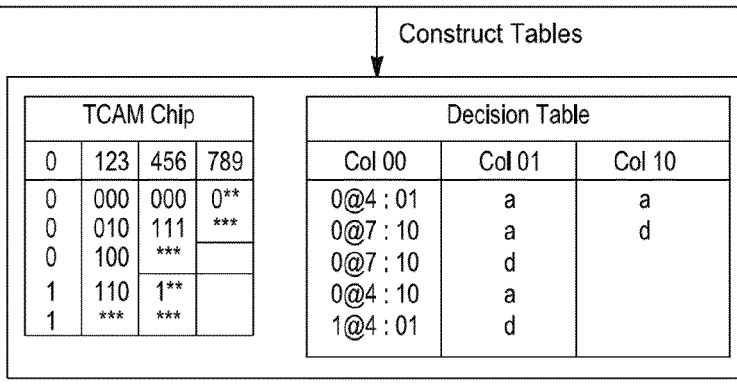
*Fig-7B*

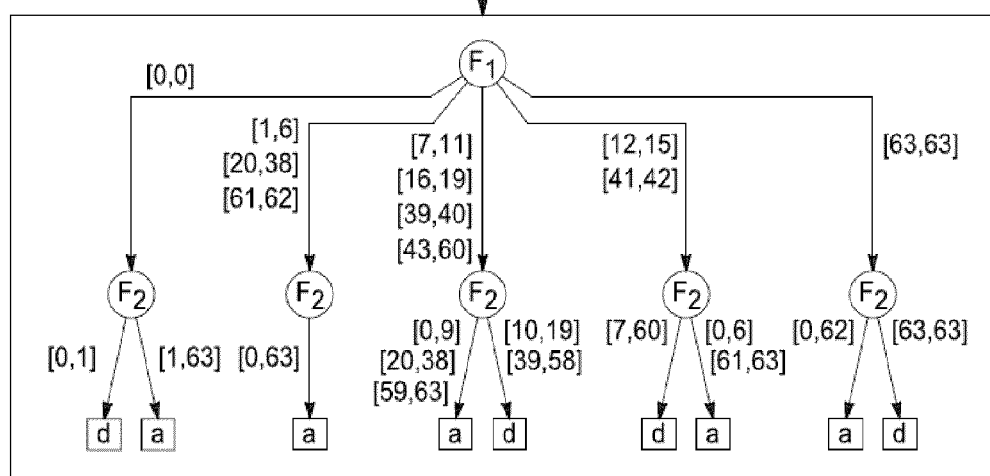
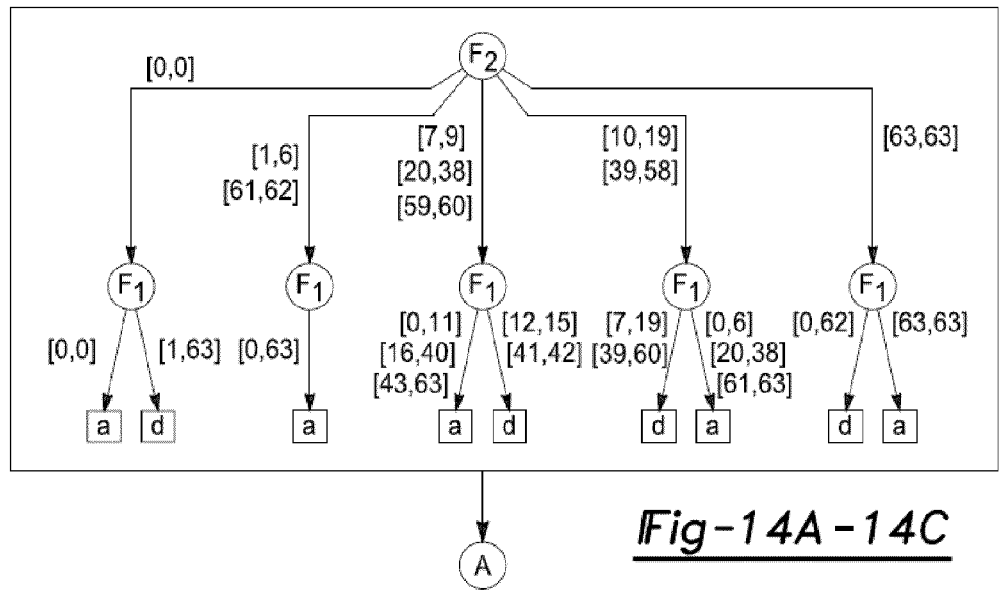
Fig-14A-14C (A)          (B)

EFFICIENT TCAM-BASED PACKET CLASSIFICATION USING MULTIPLE LOOKUPS AND CLASSIFIER SEMANTICS

CROSS-REFERENCE TO RELATED APPLICATIONS

This application claims the benefit and priority of 61/234,390, filed Aug. 17, 2009. The entire disclosure of the above application is incorporated herein by reference.

FIELD

The present disclosure relates to methods for constructing a packet classifier for a computer network system.

BACKGROUND

Packet classification is the core mechanism that enables many networking devices, such as routers and firewalls, to perform services such as packet filtering, quality of service, traffic monitoring, virtual private networks (VPNs), network address translation (NAT), load balancing, traffic accounting and monitoring, differentiated services (Diffserv), etc. The fundamental problem is to compare each packet with a list of predefined rules, which we call a packet classifier, and find the first (i.e., highest priority) rule that the packet matches. Table 1 shows an example packet classifier of three rules. The format of these rules is based upon the format used in Access Control Lists (ACLs) on Cisco routers. In this paper we use the terms packet classifiers, ACLs, rule lists, and lookup tables interchangeably.

Hardware-based classification using Ternary Content Addressable Memories (TCAMs) is the de facto industry standard. Whereas a traditional random access memory chip receives an address and returns the content of the memory at that address, a TCAM chip does the converse: it receives content and returns the address of the first entry where the content lies in the TCAM in constant time (i.e., a few clock cycles). Exploiting this hardware feature, TCAM-based packet classification stores a rule in a TCAM entry as an array of 0's, 1's, or *'s (don't-care values). A packet header (i.e., a search key) matches an entry if and only if their corresponding 0's and 1's match. Given a search key to a TCAM, the circuits compare the key with all its occupied entries in parallel and return the index (or the content, depending on the chip architecture and configuration,) of the first matching entry. TCAM-based classification is widely used because of its high speed. Although software based classification has been extensively studied, these schemes cannot match the wire speed performance of TCAM-based packet classification systems.

Although TCAM-based packet classification is the de facto industry standard because packets can be classified in constant time, the speed and power efficiency of each memory access decreases significantly as TCAM chip capacity increases. Packet classification with a single TCAM lookup is possible because of the parallel search and priority match circuits in a TCAM chip. Unfortunately, because the capacity of the TCAM chip determines the amount and depth of circuitry active during each parallel priority search, there is a significant tradeoff between the capacity of a TCAM chip and the resulting speed and power efficiency of that chip. For example, based on the detailed TCAM power model disclosed by B. Agrawal and T. Sherwood in "Modeling team power for next generation network devices" In Proc. IEEE International Symposium of Performance Analysis of Systems and Software (2006), a single search on a 36 megabit (Mb) TCAM chip, the largest available, takes 483.4 nanojoules (nJ) and 46.9 nanoseconds (ns), whereas the same search on a 1 Mb TCAM chip takes 17.8 nJ and 2.1 ns.

Building an efficient TCAM-based packet classification system requires careful optimization of the size, speed, and power of TCAM chips. On one hand, there is pressure to use smaller capacity TCAM chips because small TCAM chips consume less power, generate less heat, occupy less line card space, have a lower price, and support faster lookups. TCAM chips consume a large amount of power due to their parallel searching. The power consumed by a TCAM chip is about 1.85 Watts per megabit (Mb), which is roughly 30 times larger than a comparably sized SRAM chip. The high power consumption consequently causes TCAM chips to generate a huge amount of heat. TCAM chips have large die areas. A TCAM chip occupies 6 times (or more) board space than an equivalent capacity SRAM chip. The large die area of TCAM chips leads to TCAM chips being very expensive, often costing more than network processors. Although the limited market size may contribute to TCAM's high price, it is not the main reason. Finally, as we noted earlier, smaller TCAM chips support much faster lookups than larger TCAM chips.

On the other hand, there is pressure to use large capacity TCAM chips. The first reason is that encoding packet classification rules into TCAM rules often results in an explosion in the number of rules, which is referred to as the range expansion problem. In a typical classification rule, the fields of source and destination IP addresses and protocol type are specified as prefixes, so they can be directly stored in a TCAM. However, the fields of source and destination port numbers are specified in ranges, which need to be converted to one or more prefixes before being stored in a TCAM. This can lead to a significant increase in the number of TCAM entries needed to encode a rule. For example, 30 prefixes are needed to represent the single range [1, 65534], so 30 ×30=900 TCAM entries are required to represent the single rule $r_1$ in Table 1 below.

| Rule | Source IP Protocol | Dest. IP | Source Port | Dest. Port | Action |
| --- | --- | --- | --- | --- | --- |
| $r_1$ | 3.2.1.0/24 TCP | 192.168.0.1 | [1, 65534] | [1, 65534] | discard |
| $r_2$ | * | * | * | * | accept |

The second reason to use large TCAM chips is that packet classifiers are growing rapidly in length and width due to several causes. First, the deployment of new Internet services and the rise of new security threats lead to larger and more complex packet classification rule sets. While traditional packet classification rules usually examine the five standard header fields, new classification applications examine additional fields such as classified, protocol flags, ToS (type of service), switch port numbers, security tags, etc. Second, with the increasing adoption of IPv6, the number of bits required to represent source and destination IP addresses will grow from 64 to 256. The growth of packet classifier length and width puts more demand on TCAM capacity, power consumption, and heat dissipation.

Range reencoding schemes have been proposed to improve the scalability of TCAMs, primarily by mitigating the effect of range expansion. The basic idea is to first reencode a classifier into another classifier that requires less TCAM space and then reencode each packet correspondingly such that the decision made by the reencoded classifier for the reencoded packet is the same as the decision made by the original classifier for the original packet. Range reencoding has two possible benefits: rule width compression so that narrower TCAM entries can be used and rule number compression so that fewer TCAM entries can be used.

In another aspect of this disclosure, we observe that all previous reencoding schemes suffer from one fundamental limitation: they all ignore the decision associated with each rule and thus the classifier's decision for each packet. Disregarding classifier semantics leads all previous techniques to miss significant opportunities for space compression. Fundamentally different from prior work, we view reencoding as a topological transformation process from one colored hyperrectangle to another where the color is the decision associated with a given packet. Topological transformation allows us to reencode the entire classifier as opposed to reencoding only the ranges in a classifier. Furthermore, we also view reencoding as a classification process that can be implemented with small TCAM tables, which enables fast packet reencoding. We present two orthogonal, yet composable, reencoding approaches: domain compression and prefix alignment. In domain compression, we transform a given colored hyperrectangle, which represents the semantics of a given classifier, to the smallest possible "equivalent" colored hyperrectangle. This leads to both optimal rule width compression as well as rule number compression. In prefix alignment, on the other hand, we strive for rule number compression only by transforming a colored hyperrectangle to an equivalent "prefix-friendly" colored hyperrectangle where the ranges align well with prefix boundaries, minimizing the costs of range expansion.

This section provides background information related to the present disclosure which is not necessarily prior art.

SUMMARY

A method is provided for constructing a packet classifier for a computer network system. The method includes: receiving a set of rules for packet classification, where a rule sets forth values for fields in a data packet and a decision for data packets having matching field values; representing the set of rules as a directed graph; partitioning the graph into at least two partitions; generating at least one lookup table for each partition of the graph; and instantiating the lookup tables from one partition on a first content-addressable memory and the lookup tables from the other partition on a second content-addressable memory device.

In another aspect of this disclosure, a method is provided for encoding multiple ranges of values for a given field in a data packet as defined in a rule of a packet classifier. The method includes: finding candidate cut points over an entire domain of values for the given field, where candidate cut points correspond to starting or ending points in the ranges of values for the given field; selecting a number of bits to be used to encode the domain in a binary format; and recursively dividing the domain of values along the candidate cut points using dynamic programming and mapping each range of values to a result that is represented in a binary format using the selected number of bits.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

FIGS. 1A and 1B depicts a two-dimensional prefix classifier and a representation of the same using three one-dimensional tables, respectively;

FIG. 2A depicts an exemplary two-dimensional packet classifier;

FIG. 2B depicts an equivalent representation of the packet classifier as a directed graph;

FIG. 2C depicts a reduced representation of the directed graph;

FIG. 2D depicts four TCAM tables that correspond to the four nonterminal nodes in the reduced directed graph;

FIG. 2E illustrates the process of table concatenation;

FIGS. 6A and 6B are diagrams illustrating how TCAM tables can be shadow packed and a graph representation of the shadowing relationship among the tables, respectively;

FIGS. 7A and 7B illustrate the shadow packing process for tables depicted in FIG. 2;

FIGS. 14A-14G illustrate an example of the domain compression technique;

Figure 3:
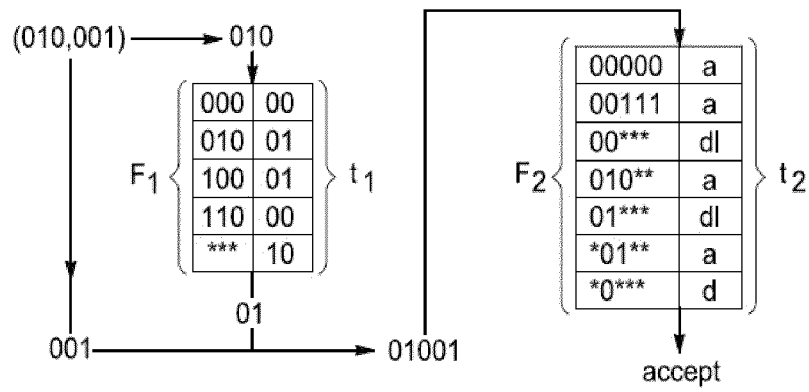
FIG. 3 illustrate the packet lookup process for the tables depicted in FIG. 2E.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

To overcome the fundamental limitations of existing TCAM optimization schemes with respect to the multiplicative effect, the conventional scheme of performing a single d-dimensional lookup on a single d-dimensional classifier in a TCAM is abandoned. Instead, splitting a single d-dimensional classifier stored on a single large and slow TCAM chip into $k \leq d$ smaller classifiers stored on a pipeline of k small and fast TCAM chips is proposed (referred to herein as TCAM SPliT). While reference is made throughout this disclosure to ternary content addressable memory, concepts disclosed herein are applicable to other types of content addressable memory, random access memory or combination thereof.

The proposed TCAM SPliT approach greatly reduces the total required TCAM space. Different than other TCAM optimization schemes, it effectively deals with the multiplicative effect by splitting apart dimensions that do not combine well together. For example, represent an exemplary 2-dimensional classifier that illustrates the multiplicative effect in FIG. 1A using the three one-dimensional tables in FIG. 1B requiring a total of 8 rules, each of which is only 3 bits wide. Although the one-dimensional tables only reduce the number of entries by 2 in this example, the savings would be much larger if the number of distinct entries $q_i$ in each dimension were larger. The TCAM SPliT approach also leads to much faster packet classification with lower power consumption as we enable the use of smaller and thus faster and more power efficient TCAM chips.

Concepts of fields, packets, and packet classifiers are defined formally as follows. A field $F_i$ is a variable of finite length (i.e., of a finite number of bits). The domain of field Fi of w bits, denoted D(Fi), is $[0, 2^w-1]$. A packet over the d fields $F_1, \ldots, F_d$ is a d-tuple $(p_i, \ldots, p_d)$ where each $p_i$ ($1 \leq i \leq d$) is an element of $D(F_i)$. Packet classifiers usually check the following five fields: source IP address, destination IP address, source port number, destination port number, and protocol type. The length of these packet fields are 32, 32, 16, 16, and 8, respectively. We use $\Sigma$ to denote the set of all packets over fields $F_1, \ldots, F_d$. It follows that $\Sigma$ is a finite set and $|\Sigma|=|D(F_1) \times |D(F_d)|$, where $|\Sigma|$ denotes the number of elements in set $\Sigma$ and $|D(F_i)|$ denotes the number of elements in set $D(F_i)$. It is readily understood the packet classifiers may be constructed to work with with more or less fields as well as different fields.

A rule has the form (predicate)→(decision). A (predicate) defines a set of packets over the fields $F_1$ through $F_d$, and is specified as $F_1 \in S_1 \wedge \ldots \wedge F_d \in S_d$ where each $S_i$ is a subset of $D(F_i)$ and is specified as either a prefix or a range and is specified as $F_1 \in S_1 \wedge \ldots \wedge F_d \in S_d$ where each $S_i$ is a subset of $D(F_i)$ and is specified as either a prefix or a range. A prefix $\{0,1\}^k \{*\}^{w-k}$ with k leading 0s or 1s for a packet field of length w denotes the range $[\{0,1\}^k \{0\}^{w-k}, \{0,1\}^k \{1\}^{w-k}]$. For example, prefix 01** denotes the range [0100, 0111]. A rule $F_1 \in S_1 \wedge \ldots \wedge F_d \in S_d \rightarrow \langle decision \rangle$ is a prefix rule if and only if each $S_i$ is represented as a prefix.

A packet $(p_1 \ldots, p_4)$ matches a predicate $F_1 \in S_1 \wedge \ldots \wedge F_d \in S_d$ and the corresponding rule if and only if the condition $p_1 \in S_1 \wedge \ldots \wedge p_d \in S_4$ holds. α is used to denote the set of possible values that $\langle decision \rangle$ can be. For packet classifiers, typical elements of a include accept, discard, accept with logging, and discard with logging.

A sequence of rules $(r_1, \ldots, r_n)$ is complete if and only if for any packet p, there is at least one rule in the sequence that p matches. To ensure that a sequence of rules is complete and thus is a packet classifier, the predicate of the last rule is usually specified as $F_1 \in D(F_1) \wedge \ldots F_d \in \wedge D(F_d)$. A packet classifier f is a sequence of rules that is complete. The size of f, denoted |f|, is the number of rules in f. A packet classifier f is a prefix packet classifier if and only if every rule in f is a prefix rule. Two rules in a packet classifier may overlap; that is, there exists at least one packet that matches both rules. Furthermore, two rules in a packet classifier may conflict; that is, the two rules not only overlap but also have different decisions. Packet classifiers typically resolve conflicts by employing a first-match resolution strategy where the decision for a packet p is the decision of the first (i.e., highest priority) rule that p matches in f.

When using a TCAM to implement a packet classifier, all rules are typically required to be prefix rules. However, in a typical packet classifier rule, some fields such as source and destination port numbers are represented as ranges rather than prefixes. This leads to range expansion, the process of converting a rule that may have fields represented as ranges into one or more prefix rules. In range expansion, each field of a rule is first expanded separately. The goal is to find a minimum set of prefixes such that the union of the prefixes corresponds to the range. For example, if one 3-bit field of a rule is the range [1, 6], a corresponding minimum set of prefixes would be 001, 01*, 10*, 110. The worst-case range expansion of a w-bit range results in a set containing 2w−2 prefixes. The next step is to compute the cross product of each set of prefixes for each field, resulting in a potentially large number of prefix rules. The range expansion of rule $r_1$ in Table 1 results in 30×30=900 prefix rules.

Commercially available TCAM chips are allowed to be configured with a limited set of widths, which are typically 36, 72, 144, 288, and 576 bits though some are now 40, 80, 160, 320, and 640 bits. In traditional single-lookup approaches, TCAM chips are typically configured to be 144 bits wide because the standard five packet fields constitute 104 bits. The decision of each rule could be stored either in TCAM or its associated SRAM.

In this section, how to construct a k-stage TCAM pipeline for k<d is described. First assume k=d so that each stage contains a one-dimensional packet classifier and thus requires a single-field lookup. Then describe how to construct a k-stage TCAM pipeline where k<d. In this case, some stages will contain multidimensional packet classifiers and thus require multi-field lookups.

FIGS. 2A-2E illustrate the algorithm for constructing a single-field TCAM pipeline for a given classifier. Four steps for constructing a pipeline are as follows: (1) FDD Construction: convert the classifier to its equivalent decision tree representation; (2) FDD Reduction: reduce the size of the decision tree; (3) Table Generation: treat each nonterminal node in the reduced decision tree as a 1-dimensional classifier and generate a TCAM table for this classifier; and (4) Table Concatenation: for each field, merge all the tables into one TCAM table, which will serve as one stage of the TCAM pipeline.

Classifiers can be represented using a special decision tree representation called a Firewall Decision Diagram. A Firewall Decision Diagram (FDD) with a decision set DS and over fields $F_1 \ldots, F_4$ is an acyclic and directed graph that has the following five properties. First, there is exactly one node that has no incoming edges. This node is called the root. The nodes that have no outgoing edges are called terminal nodes. Second, each node v has a label, denoted F(v), such that $$F(v) \in \begin{cases} \{F_1, \ldots, F_d\} & \text{if } v \text{ is a nonterminal node,} \\ DS & \text{if } v \text{ is a terminal node.} \end{cases}$$

Third, each edge e:u→v is labeled with a nonempty set of integers, denoted I(e), where I(e) is a subset of the domain of u's label (i.e., $I(e) \subset D(F(u))$). Fourth, a directed path from the root to a terminal node is called a decision path. No two nodes on a decision path have the same label. Fifth, the set of all outgoing edges of a node v, denoted E(v), satisfies the following two conditions: (i) Consistency: $I(e) \cap I(e')=\phi$ for any two distinct edges e and e' in E(v), (ii) Completeness: $\cup_{e \in E(v)} I(e)=D(F(v))$. Further information regard FDDs can be found in "Structure Firewall Design" by M. G. Gouda and A. X. Liu, Computer Networks Journal, 51(4):1106-1120, March 2007.

A full-length ordered FDD is an FDD where in each decision path all fields appear exactly once and in the same order. For ease of presentation, the term "FDD" is used, to mean "full-length ordered FDD" if not otherwise specified. FIG. 2B shows the FDD constructed from the classifier in FIG. 2A, where a stands for accept, d stands for discard, and dl stands for discard with log. An FDD construction algorithm, which converts a packet classifier to an equivalent full-length ordered FDD, is presented by A. X. Liu and M. G. Gouda in "Design Firewall Design", IEEE Transactions on Parallel and Distributed Systems (2008). While the following description makes reference to FDDs, it is readily understood that certain aspect of this disclosure are not limited to FDDs and may be implemented using other types of directed diagrams.

The second step is to reduce the size of the FDD. In an exemplary embodiment, the FDD is reduced by merging isomorphic subgraphs. A full-length ordered FDD f is reduced if and only if it satisfies the following two conditions: (1) no two nodes in f are isomorphic; (2) no two nodes have more than one edge between them. Two nodes v and v' in an FDD are isomorphic if and only if v and v' satisfy one of the following two conditions: (1) both v and v' are terminal nodes with identical labels; (2) both v and v' are nonterminal nodes and there is a one-to-one correspondence between the outgoing edges of v and the outgoing edges of v' such that every pair of corresponding edges have identical labels and they both point to the same node. Other types of reduction techniques are also contemplated by this disclosure.

FDD reduction is an important step in reducing the TCAM space used by the final pipeline because it reduces the number of nonterminal nodes. FIG. 2C shows the resultant FDD reduced from the one in FIG. 2B. In this work, an efficient signature-based FDD reduction algorithm is used. Suppose the reduced FDD has n nonterminal nodes. Consider any nonterminal node v. Since v is complete with respect to its labeled field, we can view v as a one-dimensional packet classifier. Construct an equivalent TCAM table Table(v) for each nonterminal node v as follows. First, for all tables of field $F_i$, we assign a unique ID of $[\log (m_i-1)]$ bits to both v and Table(v) where $m_i$ is the number of nodes with label F in the FDD. This ID will serve as the ID of both node v and table Table(v). In the case where there is a single nonterminal node with label F, no ID is assigned. For example, the IDs for the three nonterminal nodes with the label F2 in FIG. 2D are 00, 01, and 10. Second, generate a classifier for each nonterminal node v by generating one rule for each prefix on each outgoing edge of v. That is, for each of v's outgoing edges e from v to v' and for each prefix p on edge e, generate a rule r as follows: the predicate of r is p; if v' is a terminal node, the decision of r is the label of v'; if v' is a nonterminal node, the decision of r is the ID of v'. Third, minimize the number of TCAM entries in Table(v) by using an optimal, polynomial-time algorithm for minimizing one-dimensional classifiers. An exemplary algorithm is set forth by Suri et. al. in "Compressing two-dimensional routing tables", In Algorithmica, 35:287-300 (2003). Other types of algorithms may also be applied. FIG. 2D shows the four minimal TCAM tables that correspond to the four nonterminal nodes in the FDD.

The final step is to merge all TCAM tables of field F into a single table. For every nonterminal node v with label $F_i$, prepend v's ID to the predicate of each rule in Table(v). Since each table ID provides a unique signature that distinguishes that table's entries from all other table entries, all tables of field $F_i$ can be concatenated into a single table. FIG. 2E illustrates the process of table concatenation.

After table concatenation, get d TCAM tables corresponding to the d fields. These d tables can be loaded (or instantiated) into d TCAM chips, which can be chained together into a d-stage correspondingly, a d-dimensional packet lookup is SPliT into d lookups. The lookup result of the last chip is part of the search key for the (i+1)-st chip, and the result of the last chip is the decision for the packet. With such a chain, d packets can be processed in parallel in the pipeline.

FIG. 3 illustrates the packet lookup process for the two tables $t_1$ and $t_2$ in FIG. 2E. Suppose two packets (010, 001) and (111, 010) arrive one after the other. When (010, 001) arrives, the first search key, 010, is formed and sent to $t_1$ while the rest of the packet (001) is forwarded to $t_2$. When the next packet (111, 010) arrives, table $t_1$ has sent the search result 01 to table $t_2$. When the first search key for the second packet 111 is formed, the second search key for the first packet 01001 is formed in parallel, and both are sent to tables $t_1$ and $t_2$, respectively. This cycle will yield a result of accept for the first packet and a result of 10 for the second packet. The above process continues for every packet.

Figure 4:
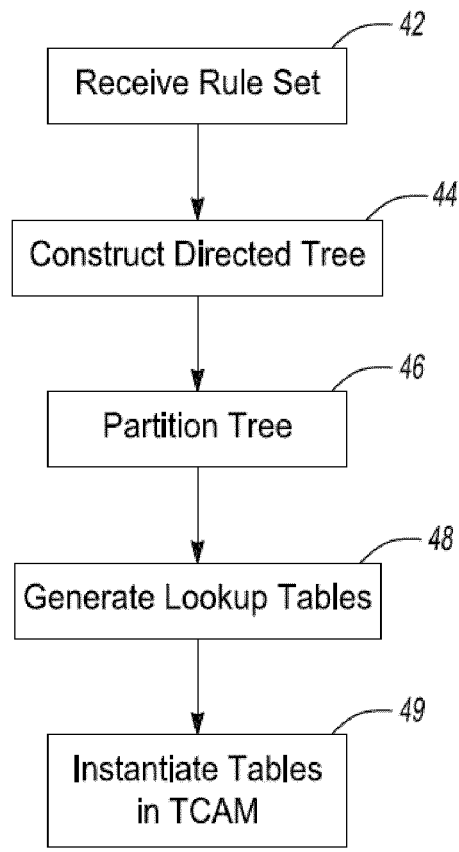
FIG. 4 is a flowchart illustrating a TCAM SPliT approach to constructing a packet classifier.
Figure 5:
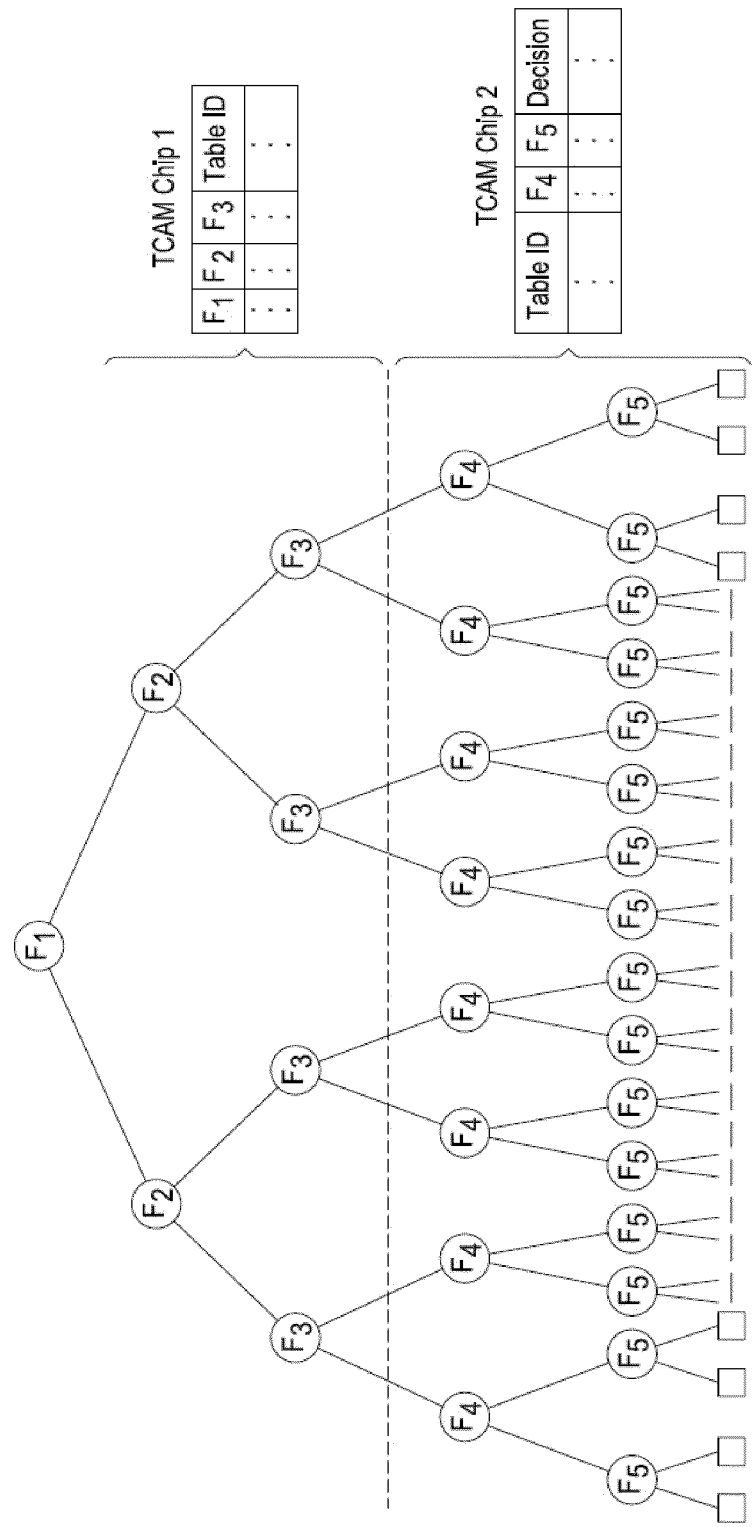
FIG. 5 illustrates partitioning an exemplary directed graph in accordance with the TCAM SPliT approach.
Figure 8A:
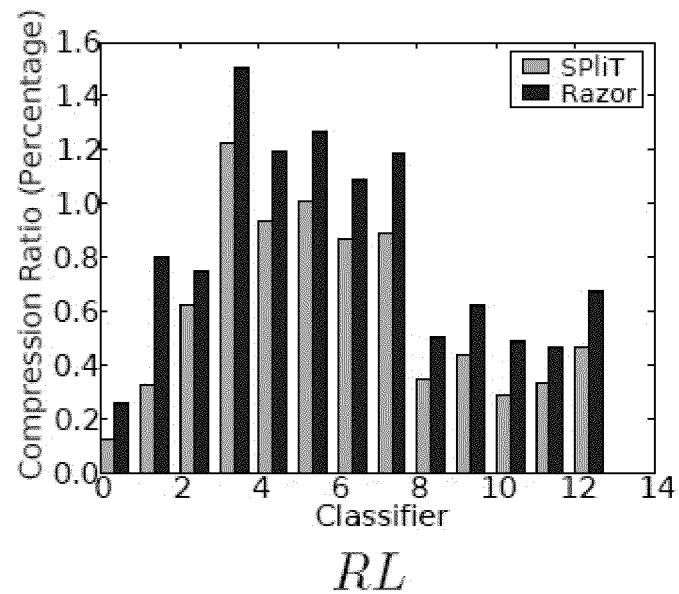
FIG. 8 illustrates the compression ratios for two exemplary packet classifiers.
Figure 8B:
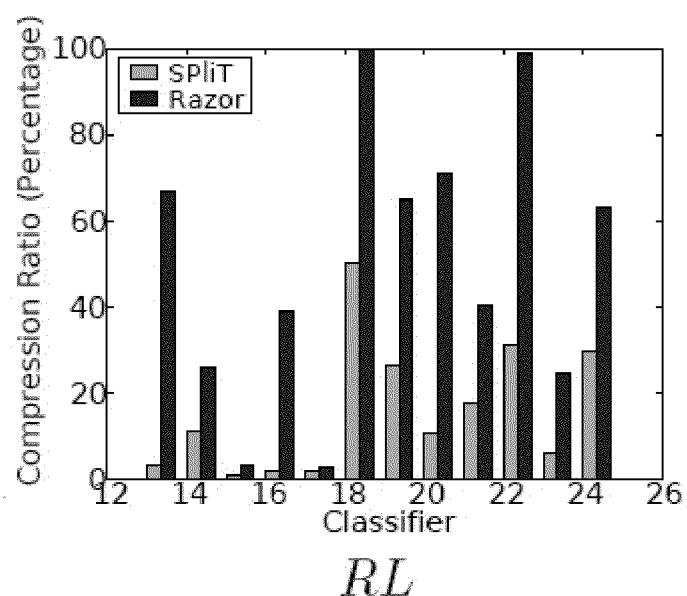
Figure 8C:
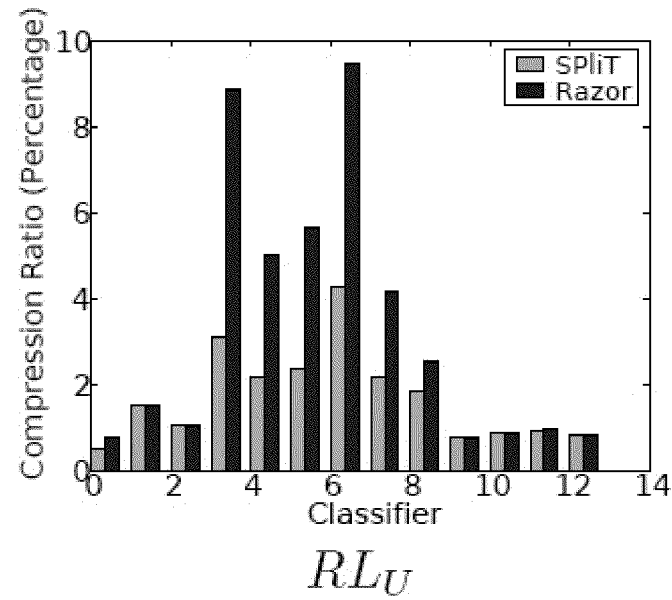
Figure 8D:
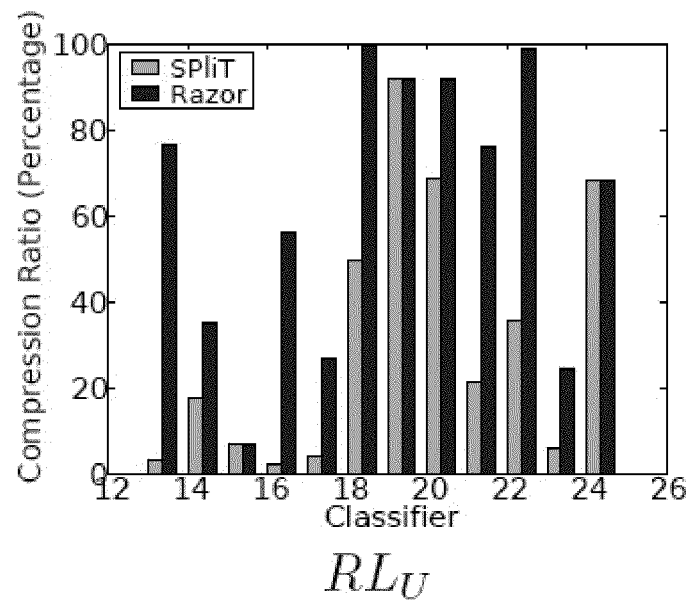

With reference to FIGS. 4 and 5, a method for constructing a packet classifier in accordance with the TCAM SPliT approach is further described. A packet classifier defined by a set of rules for packet classification serves as the starting point. The set of rules is first represented at 44 as a directed graph. The graph is then partitioned at 46 into at least two partitions: a top partition and a bottom partition. The graph is partitioned by horizontally cutting an FDD into k pieces; that is, divide the d fields into k partitions. For example, partition a 5-field FDD into two partitions as shown in FIG. 5. The top partition is a single, smaller dimensional FDD or sub-graph and consists of one 3-dimensional sub-FDD over fields F1, F2, and F3. The bottom partition contains multiple sub-FDDs and consists of eight 2-dimensional sub-FDDs over fields F4 and F5. It is readily understood that the graph may be partitioned into more or less than two partitions so long as k is less than d.

When k multi-field TCAM tables are generated, there are $\binom{d-1}{k}$ options for splitting the FDD. Define a k-split to be a partition of a sequence of FDD fields in k in order subsequences. For example, two valid 2-splits of the sequence of FDD fields $F_1, \ldots, F_5$ are $(F_1, F_2, F_3), (F_4, F_5)$ and $(F_1, F_2), (F_3, F_4, F_5)$.

Furthermore, limit the split tables to a reduced entry width. For example, limit the width of the split tables to half or quarter the width of the original entry width to space TCAM space. That is, with 2 multi-field TCAM tables, each table will be 72-bits wide, while the original table was 144-bits wide. These shorter table widths limit the number of possible splits for a given FDD considerably, which enable examining each valid split to find the split that produces the smallest tables. Define a b-valid k-split to be a k-split such that all the tables generated by the k-split fit into entries that are at most b bits wide. Given b, find the best k-split by generating tables for the b-valid k-splits from the $\binom{d-1}{k}$ choices, and using the k-split which uses the least number of entries. The algorithm below illustrates this concept.

Algorithm 1 FDD Split (FDDSPlit)

Input: F: an FDD with n fields $F_1, \ldots, F_n$ such $w(F_i)$
if the number of bits in $F_i$, a bit bound b, and a table bound k -continued Algorithm 1 FDD Split (FDDSPlit)

Output: A b-valid k-split
1: Let C be the collection of all k-splits
2: Let min = ∞ and minv = ∅
3: for each c ∈ C do
4:  if c is a b-valid k-split then
5:   Generate the list of tables for c,T = $T_1, \ldots, T_k$.
6:   Let size be the total number of entries used by T.
7:   if every table in $T_1, \ldots, T_k$ has a width of at most b bits with table IDs and size < min then
8:    Let min = size and minv = c
9:   end if
10:  end if
11: end for
12: return minc Other techniques for splitting the graph are also within the broader aspects of this disclosure.

Next, a lookup table is generated at 48 from the sub-graphs in each of the partitions. With continued reference to FIG. 5, a lookup table is generated from the sub-tree in the top partition and multiple lookup tables are generated from the bottom partition, where a lookup table is generated for each sub-tree in the bottom partition. The lookup table from the top partition is linked with the lookup tables in the bottom partition by uniquely assigned table identifiers. With the exception of two primary distinctions, the procedure for generating k multi-field TCAM tables is similar to the procedure for generating d single-field TCAM tables. First, rather than generating a single-field TCAM table from each nonterminal node, a multi-field TCAM table is generated from each sub-FDD. Second, rather than optimizing each single-field TCAM table using a single-field classifier minimization algorithm, optimization occurs for each multi-field TCAM table using a multi-field classifier minimization algorithm. An exemplary multi-field classifier minimization algorithm is disclosed by Meiners et al. in "TCAM Razor: A systematic approach towards minimizing packet classifiers in TCAMs" In Proc. 15$^{th}$ IEEE Conference on Network Protocols (October 2007) which is incorporated herein by reference. Other minimization algorithms are contemplated by this disclosure.

Lastly, the lookup tables are instantiated at 49 in content-addressable memory devices. For example, the lookup table from the lookup table from the top partition is instantiated on a first content-addressable memory device; whereas, the lookup tables from the bottom partition are instantiated on a second content-addressable memory device. It is envisioned that the lookup tables could be instantiated in random access memory or another type of memory. Packet processing in multi-field TCAM SPliT is similar to that in single-field TCAM SPliT except that a multi-field lookup is performed at each stage. This approach allows for a reduced the number of TCAM chips and lookup stages to any number less than d.

So far, assume the use of full-length FDDs where every classifier field is used. Also, assume that every packet will visit every stage of the pipeline. In some cases, both of these assumptions are unnecessary, and performance can be improved with field elimination and lookup short circuiting. Field elimination is first described. In some packet classifiers, a given field such as source IP may be irrelevant. This is the case if every node of that field has only one outgoing edge in the reduced FDD. In this case, eliminate the field from consideration and partition the remaining fields among the k chips in multi-field TCAM SPliT. After performing partitioning, it may still be the case that some nodes in the FDD will still have only one outgoing edge. For example, in a 2-stage pipeline, the decision for some packets may be completely determined by the first lookup. In such a case, an extra bit can be used to denote that the next lookup can be eliminated (or short circuited) and immediately return the decision. Note the first lookup can never be eliminated unless it is a trivial classifier. Experiments show that both field elimination and lookup short circuiting improve the performance of TCAM SPliT on real-life classifiers. In particular, field elimination creates more opportunities for shadow packing, the optimization technique is discussed next.

Packet classification rules periodically need to be updated. The common practice for updating rules is to run two TCAMs in tandem where one TCAM is used while the other is updated. TCAM SPliT is compatible with this current practice with a slight modification. First, this scheme can be implemented using two pairs of small TCAM chips. However, can also do this using only two small TCAM chips as long as the pipeline can be configured in either order. The two chip update solution would be to write the new classification rules into the unused portion of each TCAM chip. Furthermore, because of the nature of TCAM SPliT where the TCAM space requirements may be significantly different between the two TCAM chips, reversing the order of the chips in the pipeline for the next update is suggested. That is, write in the updated rules for the second chip into the free space in the current first chip, and vice versa. Once the newly updated rules are ready, allow the pipeline to clear, change the active portion of each TCAM, and then reverse the pipeline with the new updated classifiers. This type of update is supported because TCAM chips allow regions of the memory to be deactivated.

An optimization technique referred to as TCAM packing is presented below. This optimization further reduces TCAM space by allowing multiple rules from different TCAM tables to co-reside in the same TCAM entry. There are two natural ways to view TCAM packing. The first is to view columns as the primary dimension of TCAM chips and pack tables into fixed width columns. The second is to view rows as the primary dimension of TCAM chips and pack tables within fixed height rows. If we take the column-based approach and assume all tables have the same width, TCAM packing becomes a generalization of makespan scheduling on multiple identical machines. If we take the row-based approach and assume all tables have the same height, TCAM packing becomes a generalization of one-dimensional bin packing. Since both problems are NP-complete, TCAM packing is NP-hard. TCAM packing seems most similar to tiling problems where we try to fit 2-dimensional rectangles into a given geometric area. The main additional difficulty for TCAM packing is that the width of the tables is not fixed as part of the input because we must determine how many TD bits must be associated with each table.

While both the row view and the column view are natural ways to simplify the TCAM packing problem, we focus on the row view for the following two reasons. First, with the column view, when tables of varying width are allocated to the same column, the number of bits assigned to each table t is equal to h(t)×w(t') where t' is the widest table assigned to that column. This leads to many unused bits if tables of different widths are assigned to the same column. On the other hand, horizontally packed tables can be placed next to each other as keeping the vertical boundaries across multiple tables is unnecessary. Of course, there may be wasted bits if tables of different heights are packed in the same row. We try to minimize this effect by allowing some tables to be stacked in the same row if they fit within the row boundaries. Second, with the column view, table ID bits between tables in different columns cannot be shared; that is, while two adjacent tables may have the same table ID, each will have its own table ID bits. Thus, the number of bits used for table IDs grows essentially linearly with the number of columns. On the other hand, horizontally aligned tables in the same row can potentially share some "row ID" bits in their table IDs; these tables would be distinguished by their horizontal offsets.

If we view the row version of the TCAM packing problem as a 2D strip packing problem, we are basically enforcing a Top-Left property where the top and left segments of every rectangle (table) touch the boundary or another rectangle. The key additional restriction that we will enforce is a shadowing relationship. If the left segment of a rectangle $R_2$ touches the right segment of another rectangle $R_1$, the left segment of $R_2$ must be completely contained within the right segment of $R_1$. In this case, we say that rectangle $R_1$ shadows rectangle $R_2$. We define shadowing to be transitive. That is, if $R_1$ shadows $R_2$ and $R_2$ shadows $R_3$, then $R_1$ shadows $R_3$. For example, in FIG. 6A, table $t_0$ shadows tables $t_{00}$ and $t_{01}$. We say that a set of rectangles (tables) is shadow packed if their packing obeys the Top-Left Property and any rectangle not on the boundary is in the shadow of its left neighbor. For example, the rectangles in FIG. 6A are shadow packed.

An efficient algorithm, SPack, that produces shadow packed tables is also presented. A crucial property of shadow packed tables is that they facilitate the sharing of table ID bits that are in the same horizontal range. To fully explain this concept, we first formally define shadowing and shadow packing.

For a table t stored in a TCAM, we use VBegin(t) and VEnd(t) to denote the vertical indices of the TCAM entries where the table begins and ends, respectively, and we use HBegin(t) and HEnd (t) to denote horizontal indices of the TCAM bit columns where the table begins and ends, respectively. For any two tables $t_1$ and $t_2$ where [VBegin($t_2$), VEnd ($t_2$)] ⊂ [VBegin($t_1$), VEnd($t_1$)], VBegin($t_1$)≦VBegin($t_2$) <VEnd($t_2$)≦VEnd($t_1$) and HEnd($t_1$)<HBeing($t_2$), we say $t_1$ shadows $t_2$.

When table t, shadows $t_2$, the ID of $t_1$ can be reused as part of $t_2$'s ID. Suppose table t shadows tables $t_1, \ldots, t_m$. Because t's ID defines the vertical TCAM region [Begin(t), End (t)], each $t_i$ (1≦i≦m) can use t's ID to distinguish $t_i$ from tables outside [Begin(t), End(t)] vertically, and use ⌈log m⌉ bits to distinguish $t_i$ from tables inside [Begin(t), End(t)] vertically. Horizontally, table t and each table $t_i$ can be distinguished by properly setting the GMR of the TCAM.

Given a region defined vertically by [$v_1, v_2$] and horizontally by [$h_i, h_2$], all tables completely contained within this region are shadow packed if and only if there exist m (m≧1) tables $t_1 \ldots, t_m$ in the region such that the following three conditions hold:

1. Boundary $v_1$=VBegin($t_1$), VEnd($t_l$)+1=VBegin($t_l$+1) for 1≦l≦m−1, VEnd™≦$v_2$:
2. No tables are allocated to the region defined vertically by [VEnd($t_m$)+1, $v_2$] and horizontally by [$h_1, h_2$];
3. For each i (1≦i≦m), the region defined vertically by [VBegin($t_i$), VEnd ($t_i$)] and horizontally by [HEnd($t_i$)+1, $h_2$] either has no tables or the tables allocated to the region are also shadow packed.

For example, the tables in FIG. 6A are shadow packed. FIG. 6B shows the tree representation of the shadowing relationship among the tables in FIG. 6A.

Given a set of tables and a TCAM region, a shadow packing algorithm allocates the tables into the region. The goal of a shadow packing algorithm is to minimize the number of a TCAM entries occupied by the tables, i.e., to minimize VEnd ($t_m$). We call this minimization problem the. Shadow Packing Optimization Problem. This problem becomes more difficult as we recurse because we must also address which tables should be allocated to which region.

In this disclosure, we present a shadow packing algorithm SPack, which has been shown to be effective in our experiments on real-life packet classifiers. The basic idea of SPack is as follows. Given a set of tables S and a TCAM region, SPack first finds the tallest table t that will fit in the region where ties are broken by choosing the fattest table. SPack returns when there are no such tables. Otherwise, SPack places t in the top left corner of the region, and SPack is recursively applied to S−{t} in the region to the right of t. After that, let S' be the set of tables in S that have not yet been allocated. SPack is applied to S' in the region below t. Intuitively, SPack greedily packs the tallest (and fattest) possible table horizontally. The pseudocode of SPack is provided as follows:

| Algorithm 1 Shadow Packing (SPack) |
|---|
| Input: S : a set of tables, and a region [$v_1, v_2$], [$h_1, h_2$]. |
| Output: S': the set of tables in S that have not been packed. |
| 1:   Find the tallest table t ∈ S that will fit in [$v_1, v_2$], [$h_1, h_2$] such that ties are broken by choosing the fattest table; |
| 2:   if no table is found then |
| 3:       return S; |
| 4:   else |
| 5:       Place t in the top left corner of [$v_1, v_2$], [$h_1, h_2$]; |
| 6:       S'' ← SPack (S − {t}, VBegin(t), VEnd(t), HEnd(t) + 1, $h_2$); |
| 7:       return SPack(S'', VEnd(t) + 1, $v_2$, $h_1$, $h_2$); |
| 8:   end if |

We, however, must compute the initial SPack region. The height of the initial region is the total number of rules within the set of tables. We do not need to set this value carefully because SPack only moves to another row when all the remaining tables do not fit in any of the current shadows. The width is more complicated and must be computed iteratively. For each valid TCAM width w ∈ {36, 72, 144, 288}, we set the initial width to be w and run SPack. Once we have a packing, we determine the number of bits b that are needed for node IDs. If the packing could accommodate these extra b bits, we are done. Otherwise, we choose an aggressive backoff scheme by recursing with a width of w−b. It is possible, particularly for w=36, that no solution will be found. To determine which TCAM width we should use, we choose the width w ∈ {36, 72, 144, 288) whose final successful value resulted in the fewest number of required TCAM bits. Note that there are other possible strategies for determining the width of the SPack regions; for instance, instead of reducing the region width by b, the width could be reduced by 1. Furthermore, to speed up this process, SPack can be modified to abort the packing once it detects that the table packing and IDs cannot fit within the region.

Because shadow packing establishes a hierarchy of table IDs, each table needs a new ID, and all the rule decisions need to be remapped to reflect these new IDs. Each table ID is determined by a tree representation similar to the one found in FIG. 6B, which we call a shadow packing tree. For each node v in a shadow packing tree, if v has m>1 outgoing edges, each outgoing edge is uniquely labeled using ⌈log m⌉ bits; if v has only one outgoing edge, that edge is labeled *. For each table t, let v be the corresponding node in the shadow packing tree. We can construct a table ID that distinguishes t from all other table IDs by concatenating the bits labeling each edge along the path from the root to v. Note that the * corresponds to a table where no additional ID bits are needed. In our shadow packing algorithm, we reserve I bit columns in the TCAM where I is the maximum number of bits needed to distinguish a table. Reserving some bit columns for storing table IDs has the advantage of simplifying the processing of packets since the bit columns containing the table IDs are fixed in the TCAM.

FIG. 7A shows the shadow packing tree for the four tables in FIG. 2D and their reassigned table IDs. FIG. 7B shows the final memory layout in the TCAM chip after shadow packing and the conceptual memory layout of the decision table within SRAM. The one bit ID column in FIG. 7B is needed to distinguish between the tables with original IDs 01 and 11. Note that table 10 shares the table ID 0 with table 01 as it is the only table in table 01's shadow. To make the decision table in FIG. 7B easier to understand, we encode it in a memory inefficient manner using columns.

Next, the algorithm for processing packets under the shadow packing approach is described using examples. Given a packet (000, 111), the first TCAM lookup is *000****, and the lookup result is the index value of 0. This index value is used to find entry 0 in the column 00 in the SRAM which contains the decision of 0@4:01. The 0@4 means that the second lookup key should occur in table ID 0 at horizontal offset of 4, and the 01 means that the decision of the next search is located in column 01 in SRAM. To perform the second lookup, the GMR is modified to make the second lookup key 0*111***. The result of the second lookup is the index value of 1, and the decision stored in the second entry of column 01 in SRAM is retrieved, which is accept.

In the following sections, the impact TCAM SPliT has on the space, power, latency, and throughput of TCAM-based packet classification systems is evaluated. Consider TCAM SPliT with a 2-stage pipeline. Compare SPliT's performance with that of an exemplary state-of-the-art compression technique described by. Meiners et. al. in "TCAM Razor: A systematic approach towards minimizing packet classifiers in TCAMs" In Proc. 15$^{th}$ IEEE Conference on Network Protocols (October 2007) and referred to herein as "TCAM Razor". This comparison allows us to assess how much benefit is gained by going from one TCAM lookup to two TCAM lookups. The net result of the experiments is that TCAM SPliT allows us to significantly reduce required TCAM space and power consumption while significantly increasing packet classification throughput with only a small latency penalty.

Experiments are first performed on a set of 25 real-world packet classifiers, which is denoted by RL. The classifiers in RL were chosen from a larger set of real-world classifiers obtained from various network service providers, where the classifiers range in size from a handful of rules to thousands of rules. Partition the original classifiers into 25 groups where the classifiers in each group share similar structure. For example, the ACLs configured for the different interfaces of a router often share a similar structure. RL is created by randomly choosing one classifier from each of the 25 groups. We did this because classifiers with similar structure often exhibit similar results for TCAM SPliT. If all our classifiers are used, results would be skewed by the relative size of each group.

Because packet classifiers are considered confidential due to security concerns, which makes it difficult to acquire a large quantity of real-world classifiers, we generated a set of synthetic classifiers SY N with the number of rules ranging from 250 to 8000. The predicate of each rule has five fields: source IP, destination IP, source port, destination port, and protocol type. The generation method is based upon Singh et al.'s model of synthetic rules described in "Packet classification using multidimensional cutting" In Proc. ACM SIGCOMM (2003).

To stress test the sensitivity of the algorithms to the number of decisions in a classifier, a set of classifiers $RL_u$ is created by replacing the decision of every rule in each classifier by a unique decision. Similarly, we created the set $SY N_U$. Thus, each classifier in $RL_U$ (or $SY N_U$) has the maximum possible number of distinct decisions. Such classifiers might arise in the context of rule logging where the system monitors the frequency that each rule is the first matching rule for a packet.

To give a sense of the complexity of the classifier sets RL and SY N, compute the minimum number of "atomic intervals" in each field of each classifier where an atomic interval is one that does not cross any rule range boundary. We also perform direct expansion on each of these atomic intervals to compute how many "atomic prefix intervals" are contained in each field of each classifier. Table 2 below shows the average number of unique atomic intervals and atomic prefix intervals for each field for RL and SY N. We do not include $RL_U$ and $SY N_U$ since the number of atomic intervals and atomic prefix intervals is not affected by the decision associated with each rule.

|  | Average | | | | | | | | | |
|---|---|---|---|---|---|---|---|---|---|---|
|  | Atomic Intervals | | | | | Atomic Prefix Intervals | | | | |
|  | P | SIP | SP | DIP | DP | P | SIP | SP | DIP | DP |
| RL | 4.5 | 37.2 | 3.6 | 22.2 | 27.7 | 10.5 | 161.6 | 19.4 | 89.6 | 95.0 |
| SY N | 1.0 | 238.7 | 95.3 | 3.3 | 2.4 | 1.0 | 643.8 | 290.3 | 31.7 | 12.4 |

We focus our evaluation on the 2-stage pipeline where each chip is configured to be 72 bits wide. The variable order that we use to convert a classifier to an equivalent FDD affects the number of tables generated by our algorithms, which consequently affects the TCAM space efficiency. There are 5!=120 different permutations of the five packet fields (source IP address, destination IP address, source port number, destination port number, and protocol type). For RL, we tried each of the 5!=120 permutations and discovered that that the best permutation is (Protocol, Destination IP, Source Port, Destination Port, Source IP). In general, we try all possible partitions. However, since we limit each chip to be 72 bits wide, for this field order assuming no field elimination, there are only two valid partitions: (Protocol+Destination IP, Source Port+Destination Port+Source IP) and (Protocol+Destination IP+Source Port, Destination Port+Source IP). When Field elimination does occur, we have up to four valid partitions. In these cases, we select the partition that results in the best compression. Finally, in a few examples with the $RL_U$ data set, it is best to pack all five fields on one chip and only use TCAM Razor.

First define the metrics for measuring the space effectiveness of TCAM SPliT. Let C denote a classifier, S denote a set of classifiers, |S| denote the number of classifiers in S, and A denote an algorithm. We use A(C) and Direct(C) to denote the number of TCAM bits used for classifier C by algorithm A and direct expansion, respectively. For a single classifier C, we define the compression ratio of algorithm A on C as $$\frac{|A(C)|}{|Direct(C)|}.$$

For a set of classifiers S, we define the average compression ration of algorithm A over S to be $$\frac{\sum_{C \in S} \frac{|A(C)|}{|Direct(C)|}}{|S|}$$

and the total compression ration of algorithm A over S to be $$\frac{\sum_{C \in S} |A(C)|}{\sum_{C \in S} |Direct(C)|}.$$

Table 3 below shows the average and total compression ratios for TCAM SPliT and TCAM Razor on RL, $RL_U$, SY N, and $SY N_U$. FIGS. 8A, 8B, 8C, and 8D show the compression ratios for each of the classifiers in RL and $RL_U$. We SPliT RL and $RL_U$ into two groups so that the range of compression ratios in each figure is not too large to improve readability of the graphs.

|  | Compression Ratio | | | |
|---|---|---|---|---|
|  | Average | | Total | |
|  | SPliT | Razor | SPliT | Razor |
| RL | 8.0% | 24.5% | 2.0% | 8.8% |
| $RL_U$ | 16.0% | 31.9% | 6.3% | 13.1% |
| SY N | 2.6% | 10.4% | 1.7% | 7.8% |
| $SY N_U$ | 6.7% | 42.7% | 10.7% | 38.4% |

Three observations are made from the experimental results. First, TCAM SPliT achieves significant space compression and significantly outperforms TCAM Razor. For example, the average compression ratio of TCAM SPliT on RL is 8.0%, which is three times better than the average compression ratio of 24.5% achieved by TCAM Razor on the same data set. Second, TCAM SPliT is able to find compression opportunities even when TCAM Razor cannot achieve any appreciable compression. For example, TCAM Razor is unable to compress classifiers 18 and 22 in FIG. 8B whereas TCAM SPliT is able to compress these two classifiers. This illustrates how TCAM SPliT is able to eliminate some of the multiplicative effect that is unavoidable in single-lookup schemes. Third, TCAM SPliT is very effective for classifiers with a large number of distinct decisions. For example, on $RL_U$, TCAM SPliT achieves an average compression ratio of 16.0% which is roughly twice as good as TCAM Razor's average compression ratio of 31.9%. Note, there are a few cases in the $RL_U$ data set where TCAM SPliT's compression is worse than TCAM Razor's compression. In such cases, we default to using TCAM Razor and a single lookup.

The power and energy savings of TCAM SPliT and TCAM Razor are analyzed using the TCAM power model presented by Agrawal and Sherwood in "Modeling team power for next generation network devices" In Proc. IEEE Int. Symposium on Performance Analysis of Systems and Software (2006). The power, latency, and throughput models are the only publicly available models that we know of for analyzing TCAM-based packet classification schemes.

Let P(A(C)) represent the nanojoules consumed to classify one packet on a TCAM with size equal to the number of rules in A(C). For one classifier C, we define the power ratio of algorithm A as $$\frac{P(A(C))}{P(Direct(C))}.$$

For a set of classifiers S, we define the average power ratio of algorithm A over S to be $$\frac{\sum_{C \in S} \frac{P(A(C))}{P(Direct(C))}}{|S|}.$$

Figure 9A:
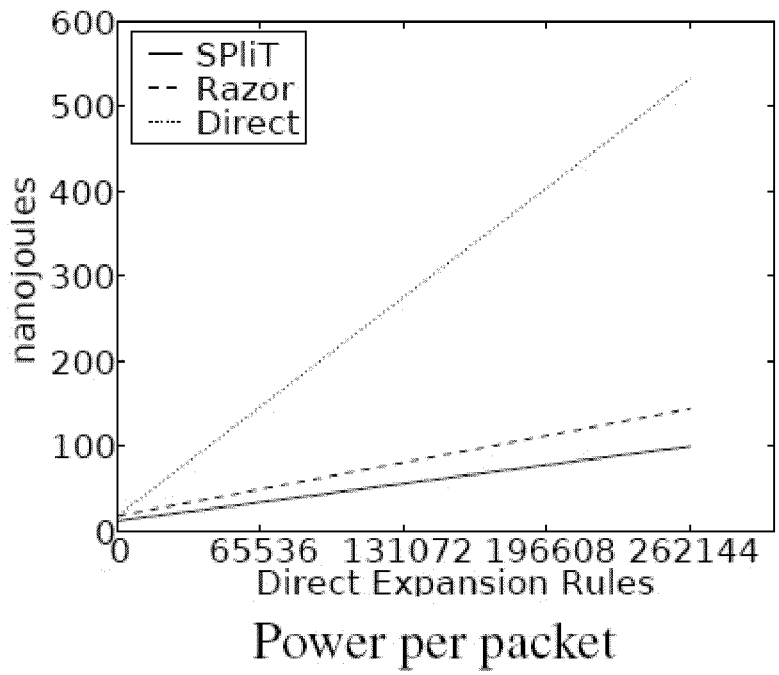
FIGS. 9A-9C are graphs depicting power, latency and throughput measures, respectively, for the exemplary packet classifiers.

Table 4 below shows the average power ratios for TCAM SPliT and TCAM Razor on RL, $RL_U$, SY N, and $SY N_U$. However, these sets only provide power ratio data for small classifiers that fit on TCAM chips that are smaller than 1 Mbit. To extrapolate the power ratio to larger classifiers, we consider theoretical classifiers whose direct expansion fits exactly within standard TCAM chip sizes ranging from 1 Mbit to 36 Mbit. We further assume that when TCAM SPliT and TCAM Razor are applied to these classifiers, the resulting compression ratios will be 8.0%o and 24.5%, respectively, on these classifiers. Finally, we use Agrawal and Sherwood's TCAM power model to calculate the power consumed by each search for each of these classifiers and their compressed versions. The extrapolated data are included in FIG. 9A and Table 4.

|  | Average | | | | | |
|---|---|---|---|---|---|---|
|  | Power | | Latency | | Throughput | |
|  | SPliT | Razor | SPliT | Razor | SPliT | Razor |
| RL | 62.1% | 90.9% | 122.5% | 97.4% | 163.3% | 102.7% |
| $RL_U$ | 62.7% | 91.2% | 123.2% | 97.6% | 161.5% | 102.6% |
| SY N | 54.8% | 80.8% | 111.9% | 89.2% | 182.8% | 114.7% |
| $SY N_U$ | 57.2% | 86.9% | 115.9% | 91.2% | 173.2% | 111.3% |
| 1 Mb | 44.3% | 63.5% | 120.0% | 81.9% | 166.7% | 122.1% |
| 2 Mb | 35.5% | 51.2% | 133.3% | 70.9% | 150.0% | 141.0% |
| 4.5 Mb | 28.2% | 41.0% | 142.9% | 71.4% | 140.0% | 140.0% |
| 9 Mb | 23.2% | 33.7% | 150.0% | 75.0% | 133.3% | 133.3% |
| 18 Mb | 20.3% | 29.5% | 123.4% | 61.7% | 162.0% | 162.0% |
| 36 Mb | 18.8% | 27.0% | 78.2% | 39.1% | 255.8% | 255.8% |

Two observations are made from the experimental results. First, although TCAM SPliT uses two TCAM chips and each chip runs at a higher frequency than the single TCAM chip in single-lookup schemes, TCAM SPliT still achieves significant power savings because of its huge space savings. TCAM SPliT reduces energy consumption per lookup at least 33% on all data sets. On our extrapolated data, the power savings of TCAM SPliT continues to grow as classifier size increases. For the largest classifier size, TCAM SPliT achieves a power ratio of 18.8%. The reason TCAM SPliT works so well is twofold. TCAM chip energy consumption is reduced if we reduce the number of rows in a TCAM chip and if we reduce the width of a TCAM chip. TCAM SPliT reduces the width of a TCAM chip by a factor of 2 (from 144 to 72), and it reduces the number of rows by a significant amount as well. Even more energy could be saved if we continued to run the smaller TCAM chips at a lower frequency. Second, TCAM SPliT significantly outperforms TCAM Razor in reducing energy consumption. For every data set, TCAM SPliT uses roughly two thirds of the power that TCAM Razor uses. For example, on RL, TCAM SPliT reduces energy per packet by 37.9% which is significantly more than TCAM Razor's 9.1% reduction.

The latency per packet of TCAM SPliT and TCAM Razor are analyzed using the TCAM lookup latency model presented by Agrawal and Sherwood. For single lookup schemes, let $L(A(C))$ represent the number of nanoseconds required to perform one search on a TCAM with size equal to the number of rules in $A(C)$. For TCAM SPliT, let $L(A(C))$ represent the number of nanoseconds required to perform both searches on the 2-stage pipeline. For one classifier C, we define the latency ratio of algorithm A as $$\frac{L(A(C))}{L(\text{Direct}(C))}.$$

For a set of classifiers S, we define the average latency ratio for algorithm A over S to be $$\frac{\sum_{C \in S} \frac{L(A(C))}{L(\text{Direct}(C))}}{|S|}.$$

Figure 9B:
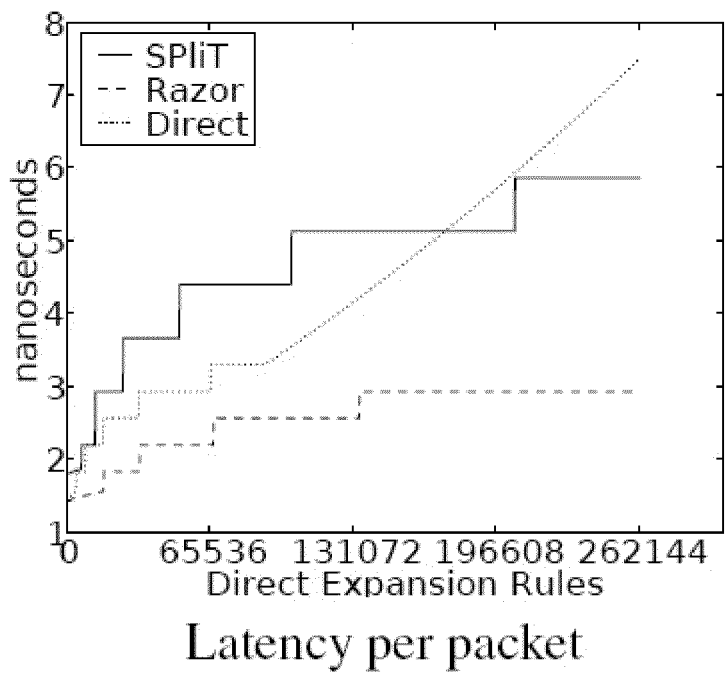

Table 4 also shows the average latency ratios for TCAM SP1iT and TCAM Razor on RL, $RL_U$, SY N, and SY $N_U$. Using the same methodology as we did for power, we extrapolate our results to larger classifiers. The extrapolated data are included in FIG. 9B and Table 4.

The following observations are made from the experimental results. Although TCAM SPliT needs to perform two TCAM lookups for each packet, its total lookup time for each packet is significantly less than double that of single lookup direct expansion. The reason is that the lookup time of a TCAM chip increases as its size increases. Since TCAM SPliT can use two small TCAM chips, its latency is significantly less than double that of single lookup direct expansion. Second, for smaller classifiers, TCAM SPliT's latency is also much less than double that of TCAM Razor. However, for large packet classifiers, its latency is basically double that of TCAM Razor. Given that packet classification systems typically measure speed in terms of throughput rather than latency, the small latency penalty of TCAM SPliT is relatively unimportant if we can significantly improve packet classification throughput.

The packet classification throughput of TCAM SPliT and TCAM Razor is also analyzed using the TCAM throughput model presented by Agrawal and Sherwood. For single lookup schemes, let $T(A(C))$ represent the number of lookups per second for a TCAM of size $A(C)$. For TCAM SPliT, let $T(A(C))$ be the minimum throughput of either stage in the 2-stage pipeline. For one classifier C, we define the throughput ratio of algorithm A as $$\frac{T(A(C))}{T(\text{Direct}(C))}.$$

For a set of classifiers S, we define the average throughput ratio for algorithm A over S to be $$\frac{\sum_{C \in S} \frac{T(A(C))}{T(\text{Direct}(C))}}{|S|}.$$

Figure 9C:
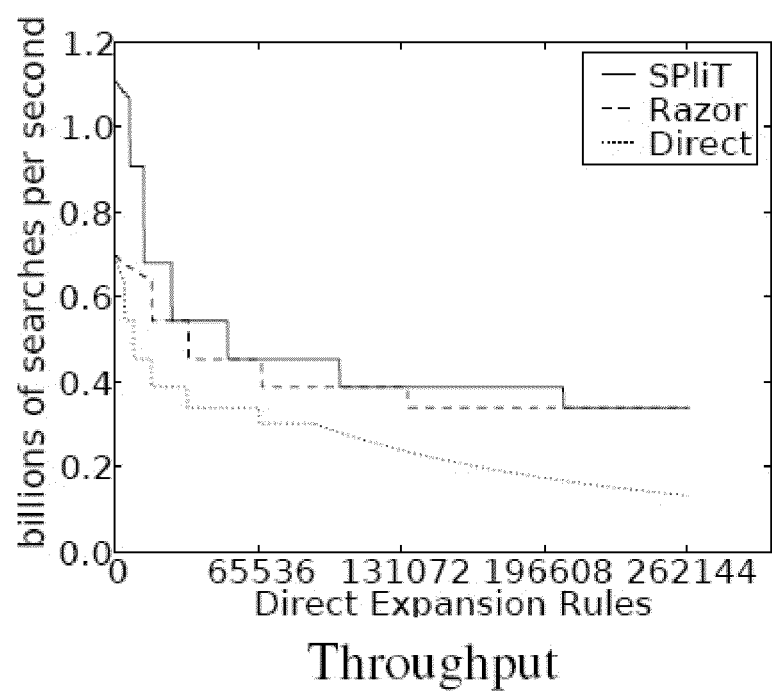

Table 4 shows the average throughput ratios for TCAM SPliT on RL, $RL_U$, SY N, and SY $N_U$. Using the same methodology we did for power and latency, we extrapolate our results to larger classifiers. The extrapolated data are included in FIG. 9C and Table 4.

We make the following observations from the experimental results. Compared with direct expansion, TCAM SPliT significantly increases throughput for classifiers of all size. The typical improvement is in the 60%-80% range. For an extremely large classifier whose direct expansion requires a 36 Mbit TCAM, TCAM SPliT improves throughput by 155.8%. Second, for smaller classifiers, TCAM SPliT outperforms even TCAM Razor. For example, on the RL data set, TCAM SPliT improves throughput by roughly 60% when compared to TCAM Razor. For large classifiers, TCAM SPliT and TCAM Razor achieve essentially the same throughput.

In an exemplary embodiment, the TCAM SPliT algorithm was implemented on Microsoft.Net framework 2.0 and the experiments were carried out on a desktop PC running Windows XP with 8G memory and a single 2.81 GHz AMD Athlon 64×2 5400+. All algorithms used a single processor core.

Figure 10:
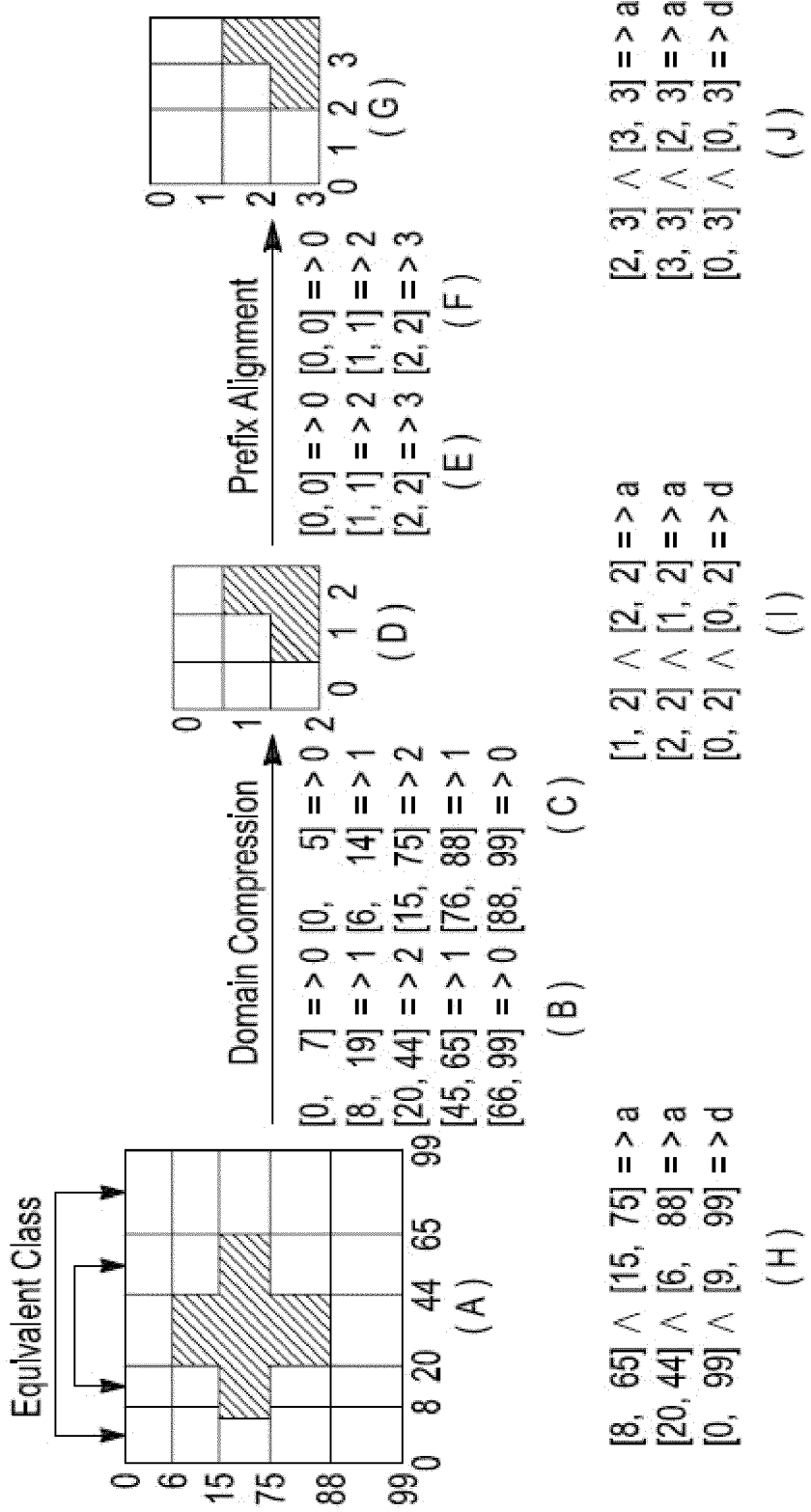
FIGS. 10A-10J illustrate an exemplary topological transformation process.

In another aspect of this disclosure, a topological view of the TCAM encoding process is proposed, where the semantics of the packet classifier is considered. In most packet classifiers, many coordinates (i.e., values) within a field domain are equivalent. The idea of domain compression is to reencode the domain so as to eliminate as many redundant coordinates as possible. This leads to both rule width and role number compression. From a geometric perspective, domain compression "squeezes' a colored hyperrectangle as much as possible. For example, consider the colored rectangle 102 in FIG. 10 that represents the classifier rules below the rectangle. In field $F_1$ represented by the X-axis, all values in [0, 7] $\dot{\in}$ [66, 99] are equivalent; that is, for any y $\dot{\text{i}}$ $F_2$ and any $x_1$, $x_2 \dot{\text{i}}$ [0,7] $\dot{\text{E}}$ [66, 99], packets ($x_2$, y) and ($x_2$, y) have the same decision. Therefore, when reencoding $F_i$, we can map all values in [0, 7] $\dot{\text{E}}$ [66, 99] to a single value, say 0. By identifying such equivalences along all dimensions, the rectangle 102 is reencoded to the adjacent rectangle 104, whose corresponding classifier rules are also shown below the rectangle. Two transforming tables for $F_1$ and $F_2$, respectively, are shown between the two rectangles 102, 104. "a" is used as a shorthand for "accept" and d as a shorthand for "discard".

Given a d-dimensional classifier C over fields $F_1, \ldots, F_d$, a topological transformation process produces two separate components. The first component is a set of transformers $T = \{T_i | 1 \leq i \leq d\}$ where transformer $T_i$ transforms $D(F_i)$ into a new domain $D'(F_i)$. Together, the set of transformers $T$ transforms the original packet space $\Sigma$ into a new packet space $\Sigma'$. The second component is a transformed d-dimensional classifier $C'$ over packet space $\Sigma$ such that for any packet $(p_1, \ldots, p_d) \in \Sigma$, the following condition holds:

$$C(p_1, \ldots, p_d) = C'(T_1(p_1)), \ldots, T_d(p_d))$$

Each of the d transformers $T_i$ and the transformed packet classifier $C'$ are implemented in TCAM.

The TCAM space needed by our transformation approach is measured by the total TCAM spaced needed by the d+1 tables: $C', T_1(p_1), \ldots, T_d$. Define the space used by a classifier or transformer in a TCAM as the number of entries (i.e., rules) multiplied by the width of the TCAM in bits: space=# of entries×TCAM width. Although TCAMS can be configured with varying widths, they do not allow arbitrary widths. The width of a TCAM can be set at different values such as 36, 72, 144, 288, 576 or 40, 80, 160, and 320 bits (per entry). For this section, we assume the allowable widths are 40, 80, 160, and 320 bits. The primary goal of the transformation approach is to produce $C', T_d(p_1), \ldots, T_d$ such that the TCAM space needed by these d+1 TCAM tables is much smaller than the TCAM space needed by the original classifier C. Most previous reencoding approaches ignore the space required by the transformers and only focus on the space required by the transformed classifier $C'$. Note that we can implement the table for the protocol field using SRAM if desired since the field has only 8 bits.

There are two natural architectures for storing the d+1 TCAM tables $C', T_1 \ldots, T_d$: the multi-lookup architecture and the pipelined-lookup architecture.

Figure 11:
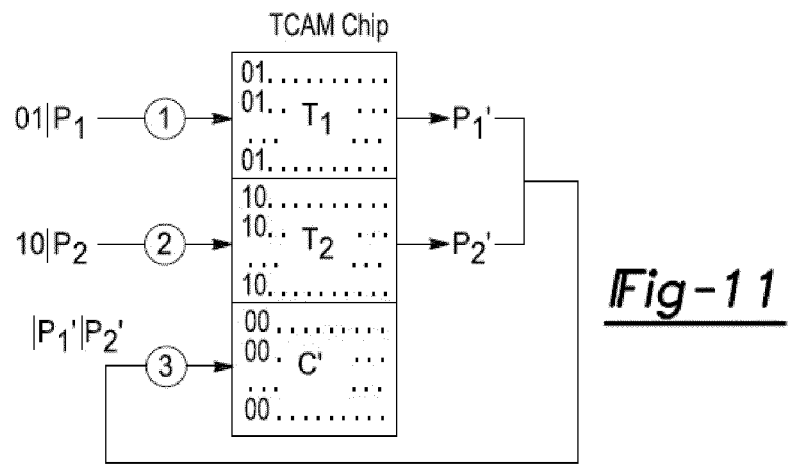
FIG. 11 illustrates an exemplary packet classification process using a multi-lookup architecture.

In the multi-lookup architecture, store all the d+1 tables in one TCAM chip. For each table, we prepend a [log (d+1)] table ID bit string to every entry. FIG. 11 illustrates the packet classification process using the multi-lookup architecture when d=2. Suppose the table IDs 00, 01, and 10 for the three tables $C', T_1$, and $T_2$, respectively, are used. Given a packet $(p_1, p_2)$, first concatenate $T_1$'s table ID 01 with $p_1$ and use the resulting bit string 01|$p_1$ as the search key for the TCAM. Let $p_2'$ denote the search result. Second, concatenate $T_2$'s table ID 10 with $p_2$ and use the resulting bit string 10|$p_2$ as the search key for the TCAM. Let $p_1'$ denote the search result. Third, concatenate the table ID 00 of C' with $p_1'$ and $p_2'$ and use the resulting bit string 00|$p_1'$|$p_2'$ as the the search key for the TCAM. The search result is the final decision for the given packet $(p_1, p_2)$.

Figure 12:
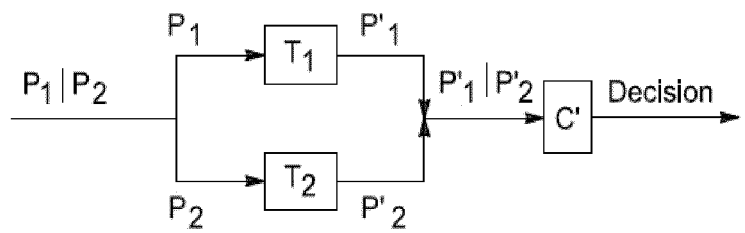
FIGS. 12 and 13 illustrate the packet classification process using a parallel pipelined-lookup architecture and a chained pipelined-lookup architecture, respectively.
Figure 13:
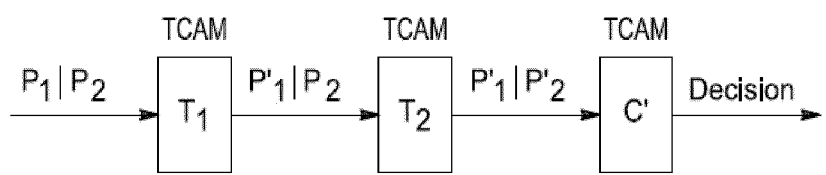

There are two natural pipelined-lookup architectures: parallel pipelined-lookup and chained pipelined-lookup. In both, store the d+1 tables in d+1 separate TCAMs, so table IDs are no longer needed. In the parallel pipelined-lookup architecture, the d transformer tables T, laid out in parallel, form a two element pipeline with the transformed classifier $C'$. FIG. 12 illustrates the packet classification process using the parallel pipelined-lookup architecture when d=2. Given a packet $(p_1, p_2)$, we send $p_1$ and $p_2$, in parallel over separate buses, to $T_1$ and $T_2$, respectively. Then, the search result $p_1'|p_2'$ is used as a key to search on $C'$. This second search result is the final decision for the given packet $(P_1, P_2)$. FIG. 13 illustrates the packet classification process using the chained pipelined-lookup architecture when d=2. We focus primarily on the parallel pipelined-lookup architecture as this allows us to minimize latency.

The main advantage of the multi-lookup architecture is that it can be easily deployed since it requires minimal modification of existing TCAM-based packet processing systems. Its main drawback is a modest slowdown in packet processing throughput because d+1 TCAM searches are required to process a d-dimensional packet. In contrast, the main advantage of the two pipelined-lookup architectures is high packet processing throughput. Their main drawback is that the hardware needs to be modified to accommodate d+1 TCAM chips (or d chips if SRAM is used for the protocol field). A performance modeling analysis of the parallel pipelined lookup and multi-lookup architectures is presented below.

An innovative domain compression technique is now described. The basic idea is to simplify the logical structure of a classifier by mapping the domain of each field $D(F_i)$ to the smallest possible domain $D'(F_i)$. We implement domain compression by exploiting the equivalence classes that any classifier C defines on the domain of each of its fields. Domain compression is especially powerful because it contributes to both rule width compression, which allows us to use 40 bit TCAM entries instead of 160 bit TCAM entries, and rule number compression because each transformed rule r' in classifier C' will contain fewer equivalence classes than the original rule r did in classifier C. Through domain compression and redundancy removal, C' typically has far fewer rules than C did, something no other reencoding scheme can achieve.

The domain compression algorithm is comprised generally of steps: (1) computing equivalence classes, (2) constructing transformer $T_i$, for each field $F_i$, and (3) constructing the transformed classifier $C'$.

First, formally define the equivalence relation that classifier C defines on each field domain and the resulting equivalence classes. Use the notation $\Sigma_{-i}$ to denote the set of all (d−1)-tuple packets over the fields $(F_1, \ldots, F_{i-1}, F_{i+1}, \ldots, F_d)$ and $p_{i-1}$ to denote an element of $\Sigma_{-i}$. Then use $C(p_i, p_{-i})$ to denote the decision that packet classifier C makes for the packet p that is formed by combining $p_i \in D(F_i)$ and $p_{-i}$.

Given a packet classifier C over fields $F_1, \ldots, F_d$, we say that $x, y \in D(F_i)$ for $1 \leq i \leq d$ are equivalent with respect to C if and only if $C(x, p_{-i}) = C(y, p_{-i})$ for any $p_{-i}, \Sigma_{-i}$ It follows that C partitions $D(F_i)$ into equivalence classes. Use the notation $C\{x\}$ to denote the equivalence class that x belongs to as defined by classifier C.

In domain compression, compress every equivalence class in each domain $D(F_i)$ to a single point in $D(F_i)$. The crucial tool of the domain compression algorithm is the Firewall Decision Diagram (FDD) noted above. After an FDD f is constructed, we can reduce f's size by merging isomorphic subgraphs to create a full length ordered FDD.

The first step of our domain compression algorithm is to convert a given d-dimensional packet classifier C to d equivalent reduced FDDs $f_1$ through $f_d$ where the root of FDD $f_i$ is labeled by field $F_i$. FIG. 14A shows an example packet classifier over two fields $F_1$ and $F_2$ where the domain of each field is [0,63]. FIGS. 14B and 14C show the two FDDs $f_1$ and $f_2$, respectively. The FDDs $f_1$ and $f_2$ are almost reduced except that the terminal nodes are not merged together for illustration purposes.

The crucial observation is that each edge out of reduced FDD $f_i$'s root node corresponds to one equivalence class of domain $D(F_i)$. For example, consider the classifier in FIG. 14A and the corresponding FDD $f_i$ in FIG. 14B. Obviously, for any $p_1$ and $p_1'$ in [7.11] ∪ [16, 19] ∪ [39, 40] ∪ [43, 60], we have $C(p_1, p_2) = C(p_1', p_2)$ for any $p_2$ in [0,63], so it follows that $C\{p_1\} = C\{p_1\}$. Thus, for any packet classifier C over fields $F_1, \ldots, F_d$ and an equivalent reduced FDD $f_i$ rooted at an $F_i$, node v, the labels of v's outgoing edges are all the equivalence classes over field $F_i$ as defined by C (referred to as the equivalence class theorem).

Given a packet classifier C over fields $F_1 \ldots F_d$ and the d equivalent reduced FDDs $f_1 \ldots f_d$ where the root node of $f_i$ is labeled $F_i$, we compute transformer $T_i$; as follows. Let v be the root of $f_i$ with m outgoing edges $e_1, ,, , e_m$. First, for each edge $e_j$ out of v, we choose one of the ranges in $e_j$'s label to be a representative label, which we call the landmark.

Figures 14D, 14E, 14F, 14G:
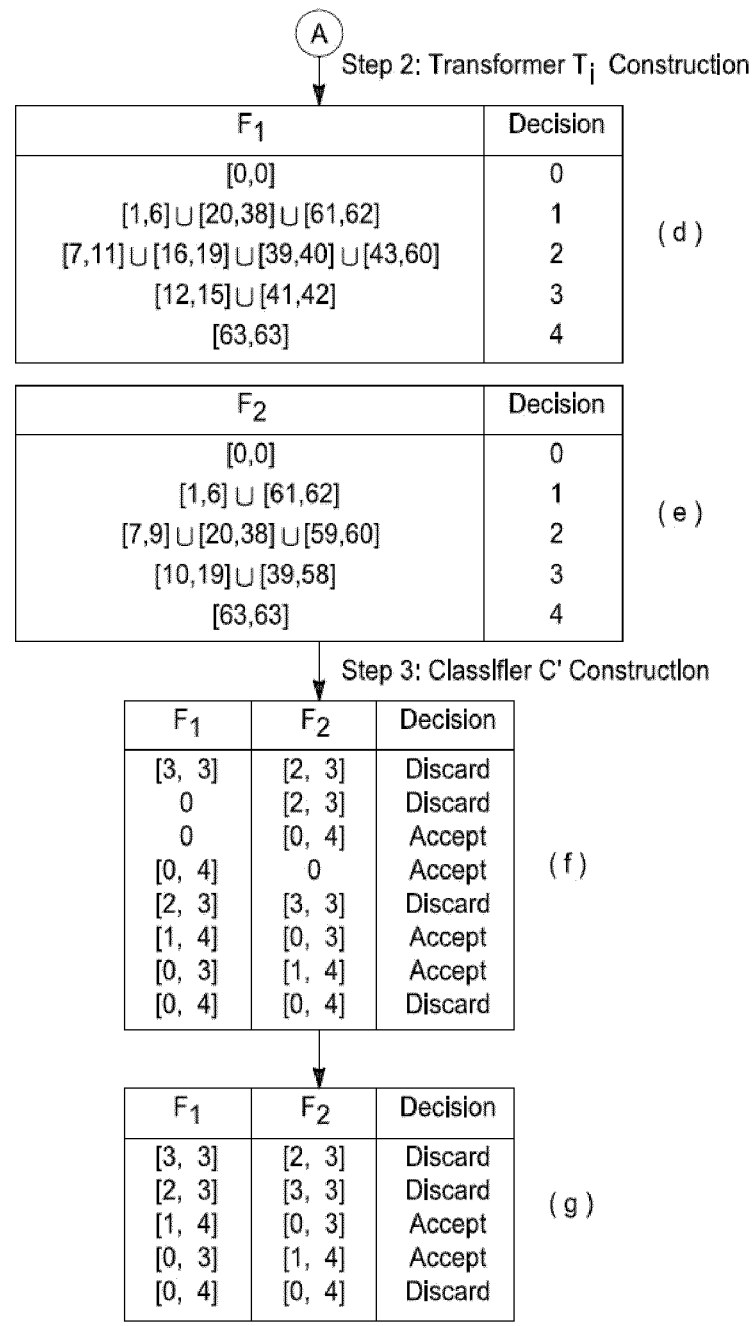

In accordance with the equivalence class theorem, all the ranges in $e_j$'s label belong to the same equivalence class, so any one of them can be chosen as the landmark. For each equivalence class, we choose the range that intersects the fewest number of rules in C as the landmark breaking ties arbitrarily. Then sort edges in the increasing order of their landmarks. Use $L_j$ and $e_j$ to denote the landmark range and corresponding edge in sorted order where edge $e_1$ has the smallest valued landmark $L_1$ and edge $e_m$ has the largest valued landmark $L_m$. Transformer $T_i$ then maps all values in $e_j$'s label to value j where $1 \leq j \leq m$. For example, in FIGS. 14B and 14C, the grayed ranges are chosen as the landmarks of their corresponding equivalence classes, and FIGS. 14D and 14E show transformers $T_1$ and $T_2$ that result from choosing those landmarks.

A transformed classifier C' is constructed from classifier C using transformers $T^i$ for $1 \leq i \leq d$ as follows. Let $F_1 \in S_1 \wedge \ldots \wedge F_d \in S_d \rightarrow$(decision) be an original rule in C. The domain compression algorithm converts $F_i \in S_i$ to $F_i' \in S_i'$ such that for any landmark range $L_j$ ($0 \leq j \leq m-1$), $L_j \cap S_i \neq \emptyset$ if and only if $j \in S_i'$. Stated another way, we replace range $S_i$ with range [a, b] $\subset D'(F_i)$ where a is the smallest number in [0, m−1] such that $L_a \cap S_i \neq \emptyset$ and b is the largest number in [0, m−1] such that $L_b \cap S_i \neq \emptyset$. Note, it is possible no landmark ranges intersect range $S_i$; in this case a and b are undefined and $S_i' \neq \emptyset$. For a converted rule $r'=F_1' \in S_1' \wedge \ldots \wedge F_d' \in S_d' \rightarrow$(decision) in C', if there exists $1 \leq i \leq d$ such that $S_i'=\emptyset$, then this converted rule r' can be deleted from C'.

Consider the rule $F_1 \in [7, 60] \wedge F_2 \in [10, 58] \rightarrow$discard in the example classifier in FIG. 14A. For field $F_1$, the five landmarks are the five grayed intervals in 14B, namely [0,0], [1,6], [7,11], [12,15], and [63, 63]. Among these five landmarks, [7,60] overlaps with [7,11] and [12,15], which are mapped to 2 and 3 respectively by transformer $T_1$. Thus, $F_1 \in [7,60]$ is converted to $F_1' \in [2,3]$. Similarly, for field $F_2$, [10,58] overlaps with only one of $F_2$'s landmarks, [10,19] which is mapped to 3 by $F_2$'s mapping table. Thus, $F_2 \in [10, 58]$ is converted to $F_2' \in [3, 3]$.

C' together with T is semantically equivalent to C. Consider any classifier C and the resulting transformers T and transformed classifier C'. For any packet $p=(p_1, \ldots, p_d)$, we have $$C(p_1, \ldots, p_d)=C'(T_1(p_1), \ldots, T_d(p_d)).$$

For each field $F_i$ for $1 \leq i \leq d$, consider p's field value $p_i$. Let $L(p_i)$ be the landmark range for $C\{p_i\}$. Set $x_i=\min(L(p_i))$. Now consider the packet $x=(x_1 \ldots, x_d)$ and the packets $x(j)=(x_1, \ldots, x_{j-1}, p_j, \ldots, p_d)$ for $0 \leq j \leq d$; that is, in packet x(j), the first j fields are identical to packet x and the last d−j fields are identical to packet p. Note $x(0)=p$ and $x(d)=x$. We now show that $C(p)=C(x)$. This follows from $C(x(0))=C(x(1))=\ldots=C(x(d))$. Each equality follows from the fact that $x_j$ and $p_j$ belong to the same equivalence class within $D(F_j)$.

Let r be the first rule in C that packet x matches. We argue that p' will match the transformed rule $r' \in C'$. Consider the conjunction $F_i \in S_i$ of rule r. Since x matches rule r, it must be the case that $x_i \in S_i$. This implies that $L(p_i) \cap S_i \neq \emptyset$. Thus, by our construction $p_i'=T_i(p_i)=T_i(x_i) \in S_i'$. Since this holds for all fields $F_i$ packet p' matches rule r'. We also argue that packet p' will not match any rule before transformed rule $r' \in C'$. Suppose packet p' matches some rule $r_1' \in C'$ that occurs before rule r'. This implies that for each conjunction $F_i \in S_i$ of the corresponding rule $r_1 \in C$ that $L(p_i) \cap S_i \neq \emptyset$. However, this implies that $x_i \in S_i$ since if any point in $L(p_i)$ is in $S_i$, then all points in $L(p_i)$ are in $S_i$. It follows that x matches rule $r_1 \in C$, contradicting our assumption that rule r was the first rule that x matches in C. Thus, it follows that p' cannot match rule $r_1'$. It then follows that r' will be the first rule in C that p' matches and the theorem follows.

Figure 15:
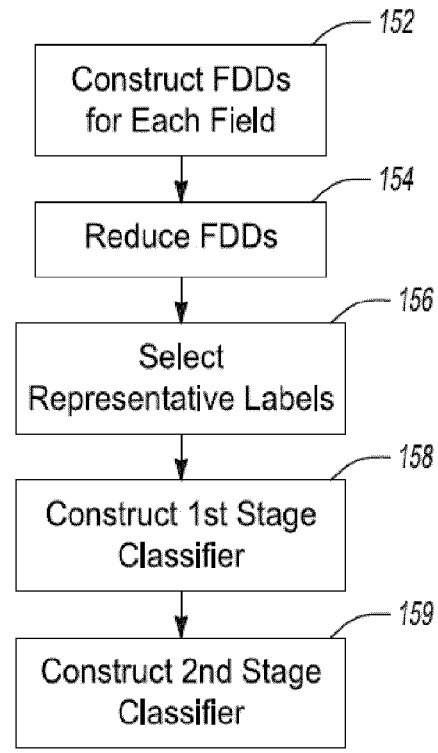
FIG. 15 is a flowchart illustrating the domain compression technique for constructing a packet classifier.

FIG. 15 further illustrates this domain compression technique for constructing a packet classifier. Given a set of rules for packet classification, a firewall decision diagram is first constructed at 152 for each field defined in the set of rules, where a root node in each of the firewall decision diagrams corresponds to a different field. Each of these firewall decision diagrams are reduced in size at 154 by merging isomorphic subgraphs therein. In each of the reduced diagrams, one label is selected at 156 for each of the outgoing edges from the root node in each of the firewall decision diagrams to be a representative label. From each of the reduced diagrams, a first stage classifier is constructed at 158, where values for a given field of a data packet maps to a result which corresponds to an input of a second stage classifier. A second stage classifier is then constructed at 159 from the set of rules based on overlap of a given rule in the set of rules with a representative label from the reduced firewall decision diagrams. More specifically, the second stage classifier is constructed by comparing each field for a given rule in the set of rules to corresponding representative labels for the field and creating a mapping from the results from the first stage classifier to the decision associated with the given rule when a field in the given rule overlaps with corresponding representative labels for the field. The first and second stage classifiers are preferably instantiated on different content-addressable memory devices but may also be instantiated on the same memory device.

In prefix alignment, we "shift", "shrink", or "stretch" ranges by transforming the domain of each field to a new "prefix-friendly" domain so that the majority of the reencoded ranges either are prefixes or can be expressed by a small number of prefixes. This will reduce the costs of range expansion and leads to rule number compression with a potentially small loss in rule width compression.

First, solve the special case where C has only one field F. An optimal solution is developed using dynamic programming techniques. This solution is then used as a building block to perform prefix alignment on multi-dimensional classifiers. Finally, compose domain compression and prefix alignment together.

Figure 16:
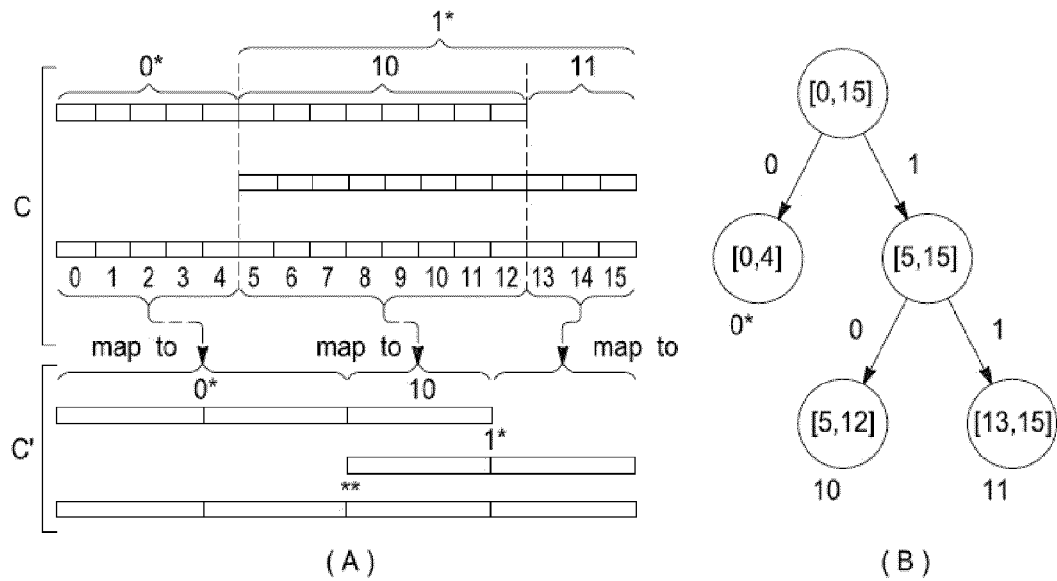
FIG. 16 illustrates an example of a one-dimensional prefix alignment.

The one-dimensional prefix alignment problem is equivalent to the following "cut" problem. Consider the three ranges [0,12], [5, 15], and [0, 15] over domain $D(F_1)=[0,15]$ in classifier C in FIG. 16A, and suppose the transformed domain $D'(F_1)=[00, 11]$ in binary format. Because $D'(F_1)$ has a total of 4 elements, we want to identify three cut points $0 \leq x_1 \leq x_2 \leq x_3 \leq 15$ such that if $[0,x_1] \in D(F_1)$ transforms to $00 \in D'(F_1)$, $[x_1+1,x_2] \in D(F_1)$ transforms to $01 \in D'(F_1)$, $[x_2+1, x_3] \in D(F_1)$ transforms to $10 \in D'(F_1)$, and $[x_3+1,15] \in D(F_1)$, transforms to $01 \in D'(F_1)$, the range expansion of the transformed ranges will have as few rules as possible. For this simple example, there are two families of optimal solutions: those with $x_1$ anywhere in [0, 3], $x_2=4$, and $x_3=12$, and those with $x_1=4$, $x_2=12$, and $x_3$ anywhere in [13,15]. For the first family of solutions, range [0, 12] is transformed to $[00,10]=0^* \cup 10$, range [5,15] is transformed to $[10,11]=1^*$, and range [0,15] is transformed to $[00, 11]=^{**}$. In the second family of solutions, range [0,12] is transformed to $[00, 01]=0^*$, range [5,15] is transformed to $[01, 11]=01 \cup 1^*$, and range [0,15] is transformed to $[00,11]=^{**}$. The classifier C' in FIG. 16A shows the three transformed ranges using the first family of solutions. In both examples, the range expansion of the transformed ranges only has 4 prefix rules while the range expansion of the original ranges has 7 prefix rules.

An optimal solution can be completed using a divide and conquer strategy. First observe that we can divide the original problem into two subproblems by choosing the middle cut point. Next observe that a cut point should be the starting or ending point of a range, if possible, in order to reduce range expansion. Suppose the target domain $D'(F_1)$ is $[0, 2^{b-1}]$. First we need to choose the middle cut point $x_2^{b-1}$, which will divide the problem into two subproblems with target domains $[0,2^{b-1}-1]=0\{*\}^{b-1}$ and $[2^{b-}, 2^b-1]=1\{*\}^{b-1}$ respectively. Consider the example in FIG. 16A, the $x_2$ cut point partitions $[0, 15]$ into $[0, x_2]$, which transforms to prefix 0*, and $[x_2+1, 15]$, which transforms to prefix 1*. The second observation implies either $x_2=4$ or $x_2=12$. Suppose we choose $x_2=4$; that is, we choose the dashed line in FIG. 16A. This produces two subproblems where we need to identify the $x_1$ cut point in the range $[0, 4]$ and the $x_3$ cut point in $[5, 15]$. In the two subproblems, we include each range trimmed to fit the restricted domain. For example, ranges $[0, 12]$ and $[0, 15]$ are trimmed to $[0, 4]$ in the first subproblem. In the second subproblem, ranges $[5,15]$ and $[0, 15]$ are trimmed to $[5,15]$ while range $[0,12]$ is trimmed to $[5,12]$. We must maintain each trimmed range even if there may be duplicates. In the first subproblem, the choice of $x_1$ is immaterial since both trimmed ranges span the entire restricted domain. In the second subproblem, the range $[5,12]$ dictates that $x_3=12$ is the right choice.

This divide and conquer process of computing cut points may be represented as a binary cut tree. FIG. 16B depicts the tree where we select $x_2=4$ and $x_3=12$. This tree also encodes the transformation from the original domain to the target domain: all the values in a terminal node are mapped to the prefix represented by the path from the root to the terminal node. For example, as the path from the root to the terminal node of $[0,4]$ is 0, all values in $[0,4] \in D(F_1)$ are transformed to 0*.

In domain compression, we considered transformers that mapped points in $D(F_i)$ to points in $D'(F_i)$. In prefix alignment, we consider transformers that map points in $D(F_i)$ to prefix ranges in $D'(F_i)$. If this is confusing, we can also work with transformers that map points in $D(F_i)$ to points in $D'(F_i)$ with no change in results; however, transformers that map to prefixes more accurately represent the idea of prefix alignment than transformers that map to points. Because we will perform range expansion on C' before performing any further optimizations including redundancy removal, we can ignore rule order. We can then view a one-dimensional classifier C as a multiset of ranges S in $D(F_1)$.

The technical details of our dynamic programming solution to the prefix alignment problem are presented by addressing four issues.

First, it is shown that prefix alignment preserves the semantics of the original classifier by first defining the concept of prefix transformers and then showing that prefix alignment must be correct when prefix transformers are used.

Given a prefix P, we use min P and max P to denote the smallest and the largest values in P, respectively. A transformer $T_i$, is an order-preserving prefix transformer from $D(F_i)$ to $D'(F_i)$ for a packet classifier C if $T_i$ satisfies the following three properties. (1) (prefix property) $\forall x \in D(F_i)$, $T_i(x)=P$ where P is a prefix in domain $D'(F_i)$; (2) (order-preserving property) $\forall x,y \in D(F_i)$, $x \leq y$ implies either $T_i(x)=T_i(y)$ or max $T_i(x) <$ min $T_i(y)$; (3) (consistency property) $\forall x,y \in D(F_i)$, $T_i(x)=T_i(y)$ implies $C\{x\}=C\{y\}$.

The following Lemma 6.1 and Theorem 6.1 easily follow from the definition of prefix transformers.

Lemma 6.1: Given any prefix transformer $T_i$ for a field $F_i$, for any a, b, x $\in D(F_i)$, x $\in [a, b]$ if and only if $T_i(x) \subseteq$ [min $T_i(a)$, max $T_i(b)$].

Theorem 6.1 (Prefix Alignment Theorem): Given a packet classifier C over fields $F_1, \ldots, F_d$, and d prefix transformers $T=\{T_i | 1 \leq i \leq d\}$, and the classifier C' constructed by replacing any range [a, b] over field $F_i$ ($1 \leq i \leq d$) by the range [min $T_i(a)$,max $T_i(b)$], the condition $C(p_1, \ldots, p_d)=C'(T_1(p_1), \ldots, T_d(p_d))$ holds.

Next, we identify candidate cut points using the concept of atomic ranges. For any multiset of ranges S (a multiset may have duplicate entries) and any range x over domain $D(F_1^*)$, we use S@x to denote the set of ranges in S that contain x. Given a multiset S of ranges, the union of which constitute a range denoted $\cup$ S, and a set of ranges S', S' is the atomic range set of S if and only if the following four conditions hold: (1) (coverage property) $\cup$ S=$\cup$ S'; (2) (disjoint property) $\forall x, y \in S'$, $x \cup y=\emptyset$; (3) (atomicity property) $\forall x \in S$ and $\forall y \in S'$, $x \cup y \neq \emptyset$ implies $y \subset x$; (4) (maximality property) $\forall x, y \in S'$ and max $x+1=$min $\overline{y}$ implies $S@x \neq S@y$.

For any multiset of ranges S, there is a unique atomic range set of S, which we denote as AR(S). Because of the maximality property of atomic range set, the candidate cut points correspond to the end points of ranges in AR(S). We now show how to compute S-start points and S-end points. For any range $[x,y] \in S$, define the points x−1 and y to be S-end points, and define the points x and y+1 to be S-start points. Note that we ignore x−1 if x is the minimum element of $\cup$ S and y+1 if y is the maximum element of $\cup$ S. Let $(s_1, \ldots, s_m)$ and $(e_1, \ldots, e_m)$ be the ordered list of S-start points and S-end points. It follows that for $1 \leq i \leq m-1$ that $s_i \leq e_i=s_{i+1}+1$. Thus, $AR(S)=\{[s_1, e_1], \ldots, [s_m, e_m]\}$.

For example, if we consider the three ranges in classifier C in example FIG. 16A, range $[0,12]$ creates S-start point 13 and S-end point 12, range $[5,15]$ creates S-end point 4 and S-start point 5, and range $[0, 15]$ creates no S-start points or S-end points. Finally, 0 is an S-start point and 15 is an S-end point. This leads to AR(S)=$\{[0, 4], [5,12], [13,15]\}$.

Next choose the number of bits b used to encode domain $D'(F_1)$. This value b imposes constraints on legal prefix transformers. Consider S=$\{[0, 4], [0,7], [0,12], [0,15]\}$ with AR(S)=$\{[0, 4], [5, 7], [8,12], [13,15]\}$. If b=2, then the only legal prefix transformer maps $[0,4]$ to 00, $[5,7]$ to 01, $[8,12]$ to 10, and $[13,15]$ to 11. If b=3, there are many more legal prefix transformers including one that maps $[0, 4]$ to 000, $[5,7]$ to 001, $[8,12]$ to 01*, and $[13,15]$ to 1**. In this case, the second prefix transformer is superior to this first prefix transformer.

Include b as an input parameter to our prefix alignment problem. Initialize b as $\lceil \log_2 |AR(S)| \rceil$, the smallest possible value, and compute an optimal prefix alignment for this value of b. Then increment b and repeat until no improvement is seen. Choose a linear search as opposed to a binary search because computing the optimal solution for b bits requires an optimal solution for b−1 bits.

Now it is shown how to compute the optimal cut points given b bits. View a one-dimensional classifier C as a multiset of ranges S in $D(F_1)$ and formulate the prefix alignment problem as follows. Given a multiset of ranges S over field $F_1$ and a number of bits b, find prefix transformer $T_1$ such that the range expansion of the transformed multiset of ranges S' has the minimum number of prefix rules and $D'(F_1)$ can be encoded using only b bits.

An optimal solution is presented using dynamic programming. Given a multiset of ranges S, we first compute AR(S). Suppose there are m atomic ranges $R_1, \ldots, R_m$, with S-start points $s_1$ through $s_m$ and S-end points $e_1$ through $e_m$ sorted in increasing order. For any S-start point $s_x$ and S-end point $s_y$, where $1 \leq x \leq y \leq m$, we define $S \cap [x,y]$ to be the multiset of ranges from S that intersect range $[s_x, s_y]$; furthermore, we assume that each range in $S \cap [x,y]$ is trimmed so that its start point is at least $s_x$ and its end point is at most $s_y$. We then define a collection of subproblems as follows. For every $1 \leq x \leq y \leq m$, we define a prefix alignment problem PA(x,y,b) where the problem is to find a prefix transformer $T_1$ for $[s_x, e_y] \subseteq D(F_1)$ such that the range expansion of $(S \cap [x,y])'$ has the smallest possible number of prefix rules and the transformed domain $D'(F_1)$ can be encoded in b bits. We use cost(x,y,b) to denote the number of prefix rules in the range expansion of the optimal $(S \cap [x,y])'$. The original prefix alignment problem then corresponds to PA(1,m,b) where b can be arbitrarily large.

The prefix alignment problem obeys the optimal substructure property. For example, consider PA(1,m,b). As we employ the divide and conquer strategy to locate a middle cut point that will establish what the prefixes $0\{*\}^{b-1}$ and $1\{*\}^{b-1}$ correspond to, there are m−1 choices of cut points to consider: namely $e_1$ through $e_{m-1}$. Suppose the optimal cut point is $e_k$ where $1 \leq k \leq m-1$. Then the optimal solution to PA(1,m,b) will build upon the optimal solutions to sub-problems PA(1,k,b−1) and PA(k+1,m,b−1). That is, the optimal transformer for PA(1,m,b) will simply append a 0 to the start of all prefixes in the optimal transformer for PA(1,k,b−1) and a 1 to the start of all prefixes in the optimal transformer for PA(k+1,m,b−1). Moreover, cost(1,m,b)=cost(1,k,b−1)+cost(k+1,m,b−1)−|S@[1,m]|. We subtract |S@[1,m]| in the above cost equation because ranges that include all of $[s_1, e_m]$ are counted twice, once in cost(1,k,b−1) and once in cost(k+1,m,b−1). However, as $[s_1, e_k]$ transforms to $0\{*\}^{b-1}$ and $[s_{k+1}, e_m]$ transforms to $1\{*\}^{b-1}$, the range $|s_1, e_m|$ can be expressed by one prefix $\{*\}^b = 0\{*\}^{b-1} \cup 1\{*\}^{b-1}$.

Based on this analysis, Theorem 6.2 shows how to compute the optimal cuts and binary cut tree. As stated earlier, the optimal prefix transformer $T_1$ can then be computed from the binary cut tree.

Given a multiset of ranges S with |AR(S)|=m, cost(l,r,b) for any $b \leq 0, 1 \leq l \leq r \leq m$ can be computed as follows. For any $1 \leq l \leq r \leq m$, and $1 \leq k \leq m$, and $b \leq 0$:

$$\text{cost}(l, r, 0) = \infty,$$

$$\text{cost}(k, k, b) = |S@[k, k]|,$$

and for any $1 \leq l < r \leq m$ and $b \geq 1$ $$\text{cost}(l, r, b) = \min_{k \in \{l, \ldots, r-1\}} \begin{pmatrix} \text{cost}(l, k, b-1) + \\ \text{cost}(k+1, r, b-1) - \\ |S@[l, r]| \end{pmatrix} \square$$

Note that we set cost(k,k,0) to |S@[k, k]| for the convenience of the recursive case. The interpretation is that with a 0-bit domain, we can allow only a single value in $D'(F_1)$; this single value is sufficient to encode the transformation of an atomic interval.

Figure 17:
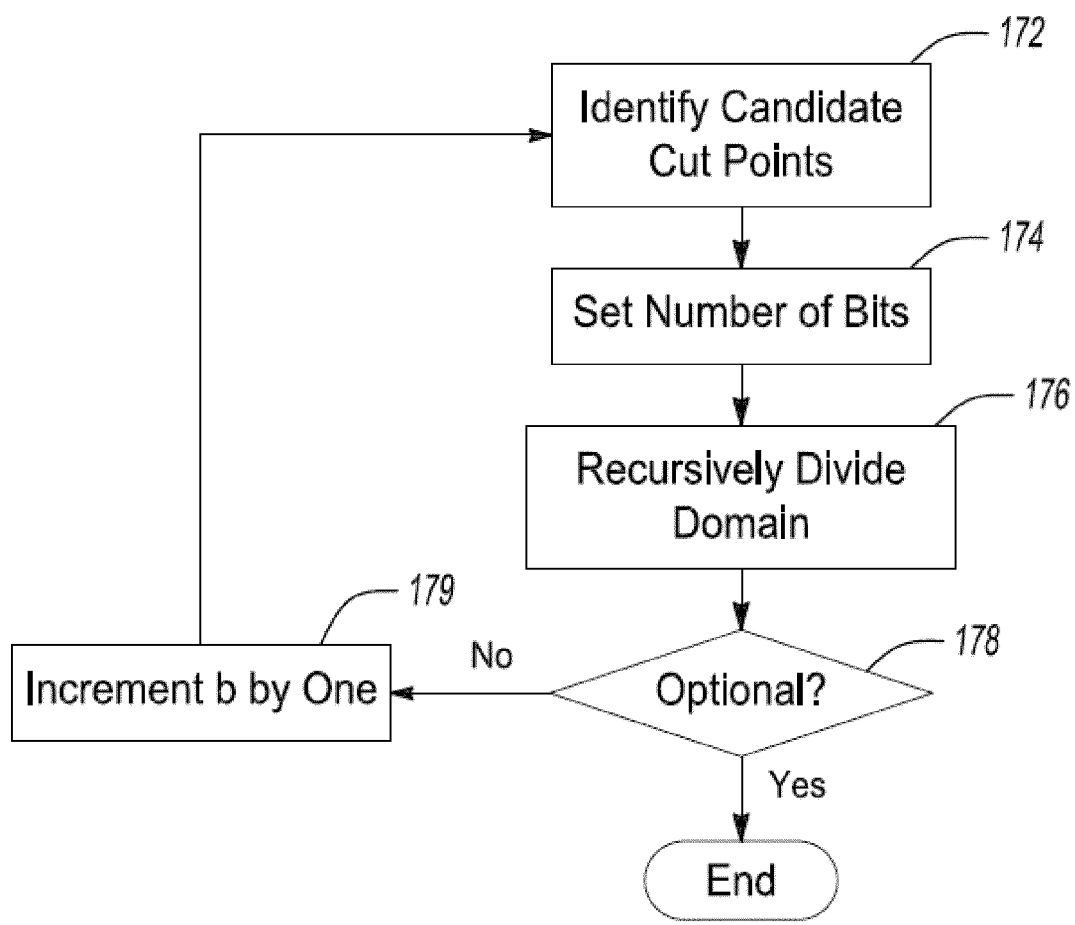
FIG. 17 is a flowchart illustrating the prefix alignment technique.

With reference to FIG. 17, the prefix alignment technique can be generalized as follows. Candidate cut points for a domain of field value are first identified at 172, where candidate cut points correspond to starting or ending points in the ranges of values for the given field. Next, a number of bits to be used to encode the domain in a binary format is selected at 174. The domain is recursively divided 176 along the candidate cut points using dynamic programming and mapping each range of values to a result that is represented in a binary format using the selected number of bits. The number of bits is incremented by one and each of the above steps are repeated until the mapping of the range values has been optimized.

Multi-dimensional prefix alignment is now considered. Unfortunately, while we can optimally solve the one-dimensional problem, there are complex interactions between the dimensions that complicate the multi-dimensional problem. In particular, the total range expansion required for each rule is the product of the range expansion required for each field. Thus, there may be complex tradeoffs where we sacrifice one field of a rule but align another field so that the costs do not multiply. The complexity of the multi-dimensional prefix alignment problem is currently unknown. A hill-climbing solution is presented where we iteratively apply our one-dimensional prefix alignment algorithm one field at a time. Because the range expansion of one field affects the numbers of ranges that appear in the other fields, we run prefix alignment for each field more than once. We stop when running prefix alignment in each field fails to improve the solution. More precisely, for a classifier C over fields $F_1, \ldots, F_d$, we first create d identity prefix transformers $T_1^0, \ldots, T_d^0$. Define a multi field prefix alignment iteration k as follows. For i from 1 to d, generate the optimal prefix transformer $T_i^k$ assuming the prefix transformers for the other fields are $T_1^{k-1}, \ldots, T_{i-1}^{k-1}, T_{i+1}^{k-1}, \ldots, T_d^{k-1}\}$. Our iterative solution starts at k=1 and preforms successive multi-field prefix alignment iterations until no improvement is found for any field.

While domain compression and prefix alignment can be used individually, they can be easily combined to achieve superior compression. Given a classifier C over fields $F_1, \ldots, F_d$, we first perform domain compression resulting in a transformed classifier C' and d transformers $T_1^{dc}, \ldots, T_d^{dc}$: then, we perform prefix alignment on the classifier C' resulting in a transformed classifier C'' and d transformers $T_1^{pa}, \ldots, T_d^{pa}$. To combine the two transformation processes into one, we merge each pair of transformers $T_i^{dc}$ and $T_i^{pa}$ into one transformer $T_i$; for $1 \leq i \leq d$. In one exemplary embodiment, an optimal algorithm as described by Suri et. al. in "Compression two-dimensional routing tables" Algorithmica, 35:287-300 (2003) is applied to compute the minimum possible transformers $T_i$ for $1 \leq i \leq d$. Other algorithms are contemplated by this disclosure. When running prefix alignment after domain compression, computing the atomic ranges and candidate cut points is unnecessary because each point $x \in D'(F_i)$ for $1 \leq i \leq d$ belongs to its own equivalence class in $D'(F_i)$ which implies [x, x] is an atomic range.

Strategies for handling the TCAM updates are now discussed. In most applications, such as router ACLs and firewalls, the rule sets are relatively static. Therefore, we propose using the bank mechanism in TCAMs to handle rule list updates. TCAMs are commonly configured into a series of row banks. Each bank can be individually enabled or disabled to determine whether or not its entries will be included in the TCAM search. We propose storing the compressed transformers and classifier before update in the active banks and the ones after update in the disabled banks. Once the writing is finished, we activate the banks containing the new transformers and compressed classifier and deactivate the banks containing the old ones.

expansion algorithm, so B(Direct(C)) represents the baseline we compare against, W(Direct(C))=104, TW(Direct(C))=160, and B(Direct(C))=160×|Direct(C)|. The table below summarizes our notation.

| A | Range encoding scheme | Direct | direct range expansion |
|---|---|---|---|
| C | packet classifier | A(C) | reencoded classifier |
| W(A(C)) | width of rules in A(C) | |A(C)| | # rules in A(C) |
| TW(A(C)) | minimum TCAM entry width for A(C) | B(A(C)) | TW(A(C)) × |A(C)|, i.e., total bits of A(C) |

In some applications, there may be more frequent updates of the rule set. Fortunately, such updates are typically the insertion of new rules to the top or front of the classifier or the deletion of recently added rules. We are not aware of any applications that require frequent updates involving rules at arbitrary locations in a classifier. We can support this update pattern by chaining the TCAM chips in our proposed architecture after a small TCAM chip of normal width (160 bits), which we call the "hot" TCAM chip. When a new rule comes, we add the rule to the top of the hot TCAM chip. When a packet comes, we first use the packet as the key to search in the hot chip. If the packet has a match in the hot chip, then the decision of the first matching rule is the decision of the packet. Otherwise, we feed the packet to the TCAM chips in our architecture described as above to find the decision for the packet. Although the lookup on the hot TCAM chip adds a constant delay to per packet latency, throughput will not be affected because we use pipelining. Using batch updating, we only need to run our topological transformation algorithms to recompute the TCAM lookup tables when the hot chip is about to fill up. Note, we may not include specific rules when running topological transformation if they are likely to be deleted in the near future. Instead, we run topological transformation on the remainder of the classifier and retain these likely to be deleted rules in the hot TCAM chip.

Packet classifiers sometimes allow rule logging; that is, recording the packets that match some particular rules. Our algorithm handles rule logging by assigning each rule that is logged a unique decision. These experiments show that even when all rules in a classifier have unique decisions, our algorithm still achieves significant TCAM space reduction.

The effectiveness and efficiency of our topological transformation approaches are evaluated on both real-world and synthetic packet classifiers. Although the two approaches can be used independently, they are much more effective when used together. Preliminary report results for both techniques used together. When a distinction is needed, we use the label DC+PA when reporting results obtained using both techniques combined and the label DC when reporting results obtained using only domain compression. In all cases, we preprocess each classifier by running a redundancy removal algorithm, such as the one described by Liu et. al. in "All-match based complete redundancy removal for packet classifiers in TCAMs" In Proceedings of the 27$^{th}$ Annual IEEE Conference on Computer Communications, April 2008.

Given a TCAM range encoding algorithm A and a classifier C, let A(C) denote the reencoded classifier, W(A(C)) denote the number of bits to represent each rule in A(C), TW (A(C)) denote the minimum TCAM entry width for storing A(C) given choices 40, 80, 160, or 320, |A(C)| denote the number of rules in A(C), and B(A(C))=TW(A(C))×|A(C)|, which represents the total number of TCAM bits required to store A(C). The main goal of TCAM optimization algorithms is to minimize B(A(C)). We use Direct to denote the direct range For any A and C, we measure overall effectiveness by the compression ratio $$CR(A(\mathbb{C})) = \frac{B(A(\mathbb{C}))}{B(\text{Direct}(\mathbb{C}))}.$$

To isolate the factors that contribute to the success of our approaches at compressing classifiers, we define the Rule Number Ratio of A on C to be $$RNR(A(\mathbb{C})) = \frac{|A(\mathbb{C})|}{|\mathbb{C}|},$$

which is often referred to as expansion ratio, and the Rule Width Ratio of A on C to be $$RWR(A(\mathbb{C})) = \frac{W(A(\mathbb{C}))}{104}.$$

When we consider a set of classifiers S where |S| denotes the number of classifiers in S, we generalize our metrics as follows. Average compression ratio of A for S is $$CR(A(S)) = \frac{\sum_{\mathbb{C} \in S} CR(A(\mathbb{C}))}{|S|},$$

average rule number ratio of A for S is $$RWR(A(S)) = \frac{\sum_{\mathbb{C} \in S} RWR(A(\mathbb{C}))}{|S|}.$$

Figure 18:
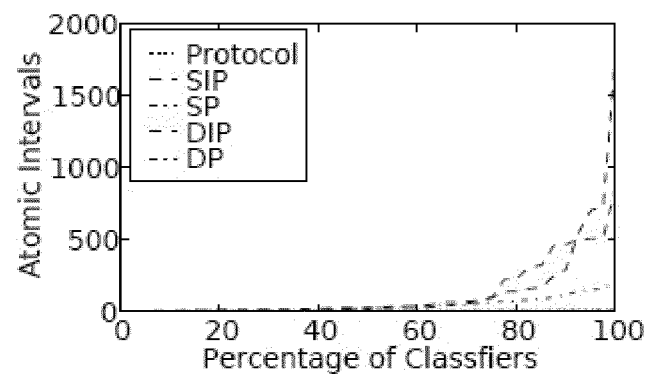
FIGS. 18 and 19 are graphs for a set of exemplary packet classifiers detailing some of their properties.
Figure 19:
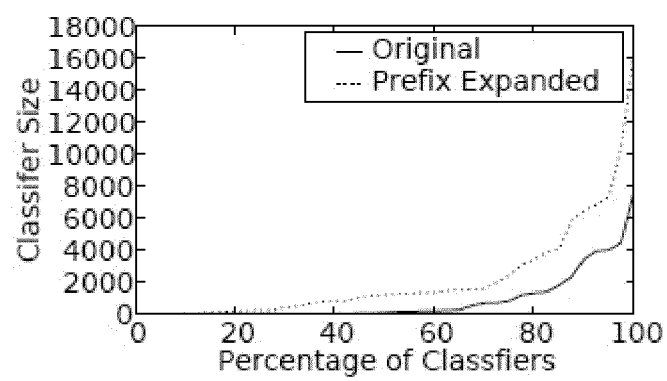

RL is used to denote a set of 40 real-world packet classifiers that we performed experiments on. RL is chosen from a larger set of real-world classifiers obtained from various network service providers, where the classifiers range in size from a handful of rules to thousands of rules. We eliminated structurally similar classifiers from RL because similar classifiers exhibited similar results. We created RL by randomly choosing a single classifier from each set of structurally similar classifiers. We then split RL into two groups, RLa and RLb where RNR(Direct(C))≦4 for all C ∈ RLa and RNR(Direct(C))>40 for all C ∈ RLb. We have no classifiers where 4<RNR(Direct(C))≦40. It turns out |RLa|=26 and |RLb|=14. By separating these classifiers into two groups, we can determine how well our techniques work on classifiers that do suffer significantly from range expansion as well as those that do not. FIG. 18 shows the accumulated percentage graph of atomic intervals for each field for the classifiers in RL, and FIG. 19 shows the accumulated percentage graphs of classifier sizes in RL before and after direct range expansion.

Because packet classifiers are considered confidential due to security concerns making it difficult to acquire a large number of real-world classifiers, we generated a set of synthetic classifiers SYN with the number of rules ranging from 250 to 8000 using Singh et al.'s model of synthetic rules. The predicate of each rule has five fields: source IP, destination IP, source port, destination port, and protocol. We also performed experiments on TRS, a set of 490 classifiers produced by Taylor&Turner's Classbench. These classifiers were generated using the parameter files downloaded from Taylor's web site http://www.arl.wusd.edu/-det3/ClmsBench/index.htm. To represent a wide range of classifiers, we chose a uniform sampling of the allowed values for the parameters of smoothness, address scope, and application scope.

To stress test the sensitivity of our algorithms to the number of decisions in a classifier, we created a set of classifiers $RL_U$ (and thus $RLa_u$ and $RLb_u$) by replacing the decision of every rule in each classifier by a unique decision. Similarly, we created the set $SYN_U$. Thus, each classifier in $RL_U$ (or $SYN_U$) has the maximum possible number of distinct decisions. Such classifiers might arise in the context of rule logging where the system monitors the frequency that each rule is the first matching rule for a packet.

Figure 20:
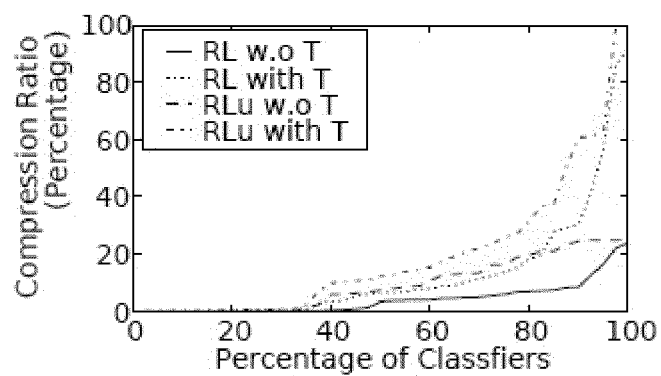
FIGS. 20-24 are graphs of experimental results when topographical transformation is applied to the set of exemplary packet classifiers.
Figure 21:
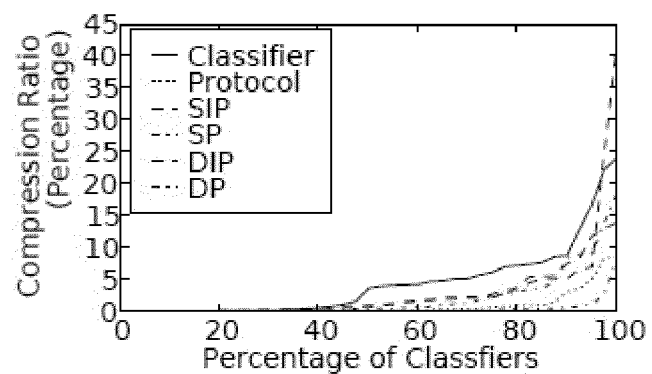
Figure 22:
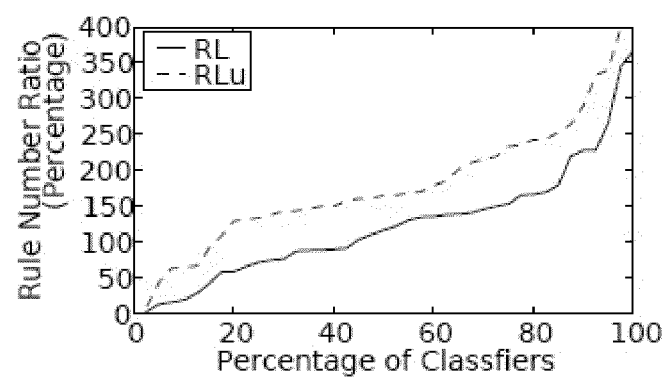
Figure 23:
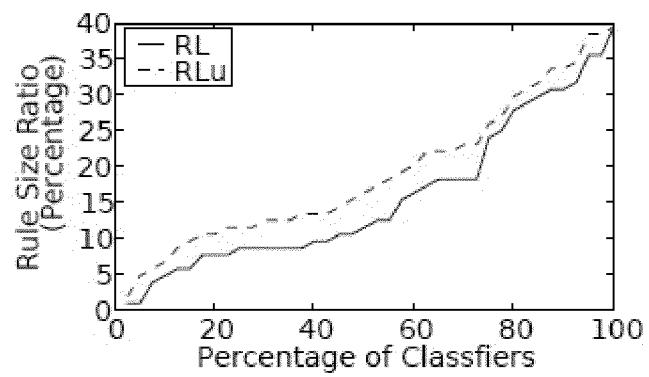

Table 6 below shows the average compression ratio, rule size ratio, and rule number ratio for our algorithm on all eight data sets. FIG. 20 shows the accumulated percentage graphs for the compression ratios of our combined techniques for both RL and $RL_U$ with and without transformers, and FIG. 21 shows the accumulated percentage graphs for the compressions ratios of our combined techniques for each field in RL. Note that the data with transformers depicts the true space savings of our methods, but most previous range encoding papers focus only on the data without transformers. FIG. 22 and FIG. 23 show the accumulated percentage graphs of our combined techniques on RL and $RL_u$ for rule number ratio and rule width ratio, respectively.

|  | compression | | | | rule number | |
| --- | --- | --- | --- | --- | --- | --- |
|  | DC | w.o. T | with T | rule size | w.o. T | with T |
| RL | 11.8% | 4.5% | 13.8% | 15.9% | 36.1% | 126.0% |
| $RL_U$ | 29.6% | 9.8% | 20.8% | 19.2% | 77.0% | 183.0% |
| RLa | 17.8% | 6.8% | 20.7% | 20.4% | 38.7% | 105.2% |
| $RLa_U$ | 44.6% | 14.9% | 31.3% | 23.6% | 82.7% | 161.7% |
| RLb | 0.6% | 0.1% | 0.9% | 7.5% | 31.2% | 164.7% |
| $RLb_U$ | 1.7% | 0.4% | 1.1% | 11.0% | 66.4% | 222.6% |
| SYN | 0.7% | 0.6% | 2.5% | 10.4% | 2.7% | 11.8% |
| $SYN_U$ | 13.4% | 9.3% | 12.4% | 16.0% | 43.9% | 58.9% |
| TRS | 6.2% | 1.0% | 2.7% | 15.7% | 9.7% | 23.3% |

Our algorithm achieves significant compression on both real-world and synthetic classifiers. On RL, our algorithm achieves an average compression ratio of 13.8% if we count TCAM space for transformers and 4.5% if we do not. These savings are attributable to both rule width and rule number compression. The average rule width compression ratio is 15.9%, which means that a typical encoded classifier only requires 17 bits, instead of 104 bits, to store a rule. However, the actual savings that rule width compression contributes to average compression ratio is only 25% because the encoded classifiers will use 40 bit wide TCAM entries, the smallest possible TCAM widths (two classifiers in $RL_U$ require an 80 bit wide TCAM entry). In comparison, direct range expansion would use 160 bit wide TCAM entries. That is, TW(A(C))=40 for all but two classifiers in $RL_U$. The remaining savings is due to rule number compression. Note that the average rule number compression ratio without transformers is 36.1%; that is, domain compression and redundancy removal eliminate an average of 63.9% of the rules from our real-life classifier sets. In comparison, the goal of all other reencoding schemes is an average rule number compression ratio without transformers of 100%. Our algorithm performs well on all of our other data sets too. For example, for Taylor's rule set TRS, we achieve an average compression ratio of 2.7% with transformers included and 1.0% with transformers excluded. Note that prefix alignment is an important component of our algorithm because it reduces the average compression ratio without transformers for RL from 11.8% to 4.5%.

Our algorithm is effective for both efficiently specified classifiers and inefficiently specified classifiers. The efficiently specified classifiers in RLa experience relatively little range expansion; the inefficiently specified classifiers in RLb experience significant range expansion. Not surprisingly, our algorithm provides roughly 20 times better compression for RLb than for RLa with average compression ratios of 0.9% and 20.7%, respectively. In both sets, TCAM width compression contributes approximately 25% savings. The difference is rule number compression. Whereas our algorithm achieves relatively similar average rule number ratios of 38.7% and 31.2% without transformers for RLa and RLb, respectively, these rule number ratios have significantly different impacts on the final compression ratios given that all the efficiently specified classifiers in RLa have modest range expansion while all the inefficiently specified classifiers in RLb have tremendous range expansion.

Our algorithm's effectiveness is only slightly diminished as we increase the number of unique decisions in a classifier. In the extreme case where we assign each rule a unique decision in $RL_u$, our algorithm achieves an average compression ratio of 20.8% with transformers included and 9.8% with transformers excluded; and on $SYN_u$, our algorithm achieves an average compression ratio of 12.4% with transformers included and 9.3% with transformers excluded. In particular, the TCAM width used by each classifier is unaffected. Rule number ratio compression is worse for $RL_u$, but the rule number ratio without transformers is still leas than 100% for all our data sets with unique decisions.

Our algorithm outperforms all existing reencoding schemes by at least a factor of 3.11 including transformers and by at least a factor of 5.54 excluding transformers. We first consider the width of TCAM entries. Our algorithm uses 40 bit wide TCAM entries for all but 2 classifiers in $RL_u$ whereas the smallest TCAM width achieved by prior work is 80 bits. Therefore, on TCAM entry width, our algorithm is 2 times better than the best known result. Next, we consider the number of TCAM entries. Excluding TCAM entries for transformers, the best rule number ratio that any other method can achieve on RL is 100% whereas we achieve 36.1%. Therefore, excluding TCAM entries for transformers, our algorithm is at least 5.54 (=2×100%/36.1%) times better than the optimal TCAM reencoding algorithm that does not consider classifier semantics.

In an exemplary embodiment, the algorithms are implemented on the Microsoft Net framework 2.0 and the experiments are performed on a desktop PC running Windows XP with 3 G memory and a single 3.4 GHz Pentium D processor. On RL, the minimum, mean, median, and maximum running time is 0.003, 37.642, 0.079, and 1093.308 seconds; on $RL_u$, the minimum, mean, median, and maximum running time is 0.006, 1540.934, 0.203, and 54604.311 seconds. Table 7 below shows running time of some representative classifiers in RL and $RL_u$.

| Size | Time (seconds) | Time (seconds) Unique Decisions |
|------|----------------|----------------------------------|
| 511  | 0.40           | 1.92                             |
| 1308 | 1.00           | 6.59                             |
| 1365 | 14.51          | 80.91                            |
| 1794 | 26.85          | 273.35                           |
| 2331 | 42.33          | 355.52                           |
| 3928 | 0.64           | 4.86                             |
| 4004 | 117.01         | 3234.90                          |
| 7652 | 1093.31        | 54604.31                         |

We now assess the impact that our two topological transformation schemes (parallel pipelined-lookup using 6 TCAM chips and multi-lookup using 1 TCAM chip) will have on power, latency, and throughput. We compare our topological transformation schemes against direct range expansion. Because we cannot build actual devices, we use Agrawal and Sherwood's power, latency, and throughput models for TCAM chips. To our best knowledge, Agrawal and Sherwood's TCAM models are the only publicly available models and have become widely adopted. To derive meaningful power results, we need much larger classifiers than the largest available classifier in RL. Rather than make large synthetic classifiers, we consider hypothetical classifiers whose direct range expansion fits exactly within standard TCAM chip sizes ranging from 1 Mbit to 36 Mbit. We further assume that when topological transformation is applied to these hypothetical classifiers, the resulting compression ratio will be 15%. Because we do not know how the bits will be allocated to each of the 5 transformers and reencoded classifier, we conservatively assume that each transformer and the reencoded classifier will have a size that is 15% of the direct expansion classifier. For power, latency, and throughput, we then use Agrawal and Sherwood's TCAM model to estimate the relevant metric on each TCAM chip. As our modeling results demonstrate, the 6 chip configuration significantly improves throughput and power and is essentially neutral on latency whereas the 1 chip configuration significantly improves power while suffering some loss in latency and throughput.

For any classifier C, let $\mathbb{P}(A(C))$ represent the nanojoules needed to classify one packet using the given scheme. For the two topological transformation schemes, we include the power consumed by the transformers. For one classifier C, we define the power ratio of algorithm A as $$\frac{\mathbb{P}(A(C))}{\mathbb{P}(\text{Direct}(C))}.$$

For a set of classifiers S, we define the average power ratio of algorithm A over S to be $$\frac{\sum_{C \in S} \frac{\mathbb{P}(A(C))}{\mathbb{P}(\text{Direct}(C))}}{|S|}.$$

Figure 24:
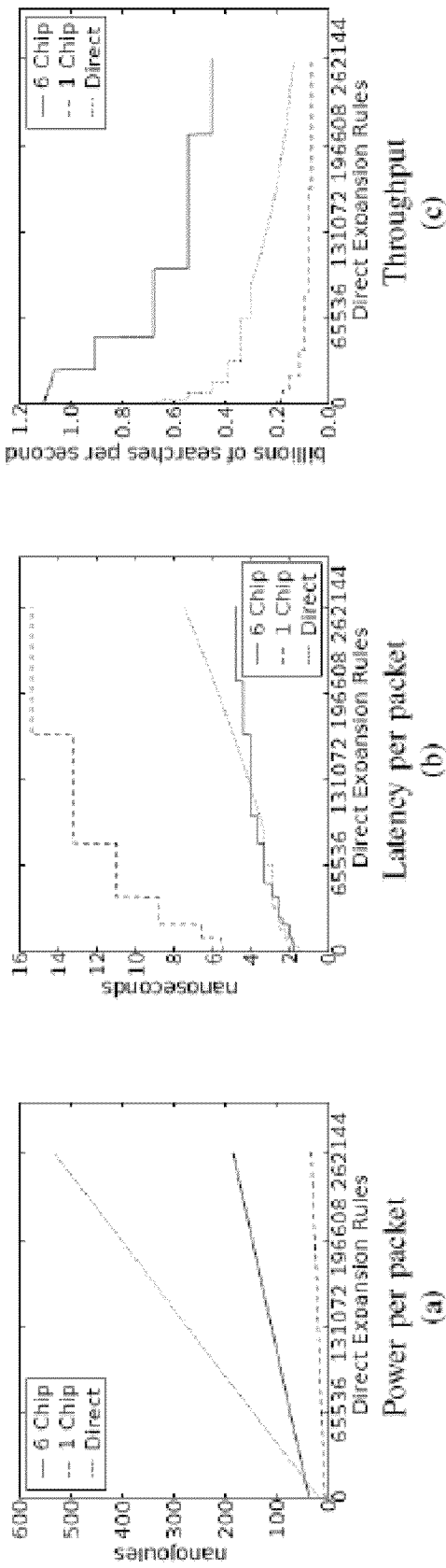

The extrapolated average power ratios are displayed in Table 8 and FIG. 24A.

The modeling results clearly demonstrate that topological transformation results in a significant improvement in power usage per search. The reason for the savings is that even though we perform more searches, each search is performed on a much smaller TCAM chip.

| | Average | | | | | |
|---|---|---|---|---|---|---|
| | Power | | Latency | | Throughput | |
| | 6 Chip | 1 Chip | 6 Chip | 1 Chip | 6 Chip | 1 Chip |
| 1 Mb   | 122.0% | 20.6% | 100.7% | 304.6% | 200.4% | 32.8% |
| 2 Mb   | 91.7%  | 15.6% | 92.0%  | 300.0% | 238.1% | 33.3% |
| 4.5 Mb | 66.8%  | 11.5% | 100.0% | 342.9% | 233.3% | 29.2% |
| 9 Mb   | 50.3%  | 8.8%  | 112.5% | 375.0% | 200.0% | 26.7% |
| 18 Mb  | 40.5%  | 7.2%  | 97.0%  | 317.4% | 226.8% | 31.5% |
| 36 Mb  | 34.8%  | 6.3%  | 63.5%  | 205.2% | 341.1% | 48.7% |

For any classifier C, let $T(A(C))$ represent the number of packets per second that can be classified using the given scheme. For topological transformation with 6 chips, this is the minimum throughput of any of the 6 TCAM chips. For topological transformation with 1 TCAM chip, this is essentially the inverse of latency because there is no pipelining. For one classifier C, we define the throughput ratio of algorithm A as $$\frac{\mathbb{T}(A(C))}{T(\text{Direct}(C))}.$$

For a set of classifiers S, we define the average throughput ratio for algorithm A over S to be $$\frac{\sum_{C \in S} \frac{\mathbb{T}(A(C))}{T(\text{Direct}(C))}}{|S|}.$$

The extrapolated average throughputs are included in FIG. 24C and Table 8.

The modeling results demonstrate that topological transformation significantly improves throughput if we use the 6 chip configuration. The reason for the throughput increase is the use of the pipeline and the use of smaller and thus faster TCAM chips. The throughput of the 1 chip configuration is significantly reduced because there is no pipeline; however, the throughput is better than 16.6% because it again uses smaller, faster TCAM chips.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method for constructing a packet classifier for a computer network system, comprising:
   receiving a set of rules for packet classification, where a rule sets forth values for fields in a data packet and a decision for data packets having matching field values;
   representing the set of rules as a directed graph;
   partitioning the graph into at least a top partition and a bottom partition, the top partition having a single sub-graph with a vertex of the graph and the bottom partition having a plurality of sub-graphs;
   generating a lookup table from the sub-graph in the top partition;
   generating a lookup table for each sub-graph in the bottom partition;
   assigning each table associated with the bottom partition a unique identifier;
   linking the lookup table from the top partition with the lookup tables in the bottom partition using the assigned table identifiers; and
   instantiating the lookup table from the top partition on a first content-addressable memory device and the lookup tables from the bottom partition on a second content-addressable memory device.

2. A method for constructing a packet classifier for a computer network system, comprising:
   receiving a set of rules for packet classification, where each rule sets forth values for fields in a data packet and a decision for data packets having matching field values;
   constructing a firewall decision diagram from the set of rules for each field defined in the set of rules, where a root node in each of the firewall decision diagrams corresponds to a different field;
   reducing size of each firewall decision diagram by merging isomorphic subgraphs therein;
   selecting one label for each outgoing edge from the root node in each of the firewall decision diagrams to be a representative label;
   constructing a first stage classifier from each of the reduced firewall decision diagrams, where values for a given field of a data packet maps to a result which corresponds to an input of a second stage classifier; and
   constructing the second stage classifier from the set of rules based on overlap of a given rule in the set of rules with a representative label from the reduced firewall decision diagrams.

3. The method of claim 2 wherein selecting one label further comprises selecting the label whose range implicates the fewest number of rules in the set of rules.

4. The method of claim 2 wherein constructing the second stage classifier further comprises comparing each field for a given rule in the set of rules to corresponding representative labels for the field; and creating a mapping from the results from the first stage classifier to the decision associated with the given rule when a field in the given rule overlaps with corresponding representative labels for the field.

5. The method of claim 2 wherein constructing the second stage classifier further comprises eliminating the given rule from the second stage classifier when a field of the given rule does not overlap with at least one representative label for the field.

6. The method of claim 2 further comprises instantiating the first and second stage classifier on content-addressable memory, a random access memory or a combination thereof.

7. The method of claim 2 further comprise instantiating the first stage classifier on a first content-addressable memory device and the second stage classifier on a second content-addressable memory device.

8. The method of claim 1 further comprises representing the set of rules as a firewall decision diagram.

9. The method of claim 8 further comprises constructing a firewall decision diagram from the set of rules for each field defined in the set of rules, where a root node in each of the firewall decision diagrams corresponds to a different field.

10. The method of claim 1 further comprises reducing the size of the directed graph by merging isomorphic subgraphs before partitioning the graph.

11. The method of claim 1 further comprises defining the content-addressable memory device as ternary content addressable memory.

* * * * *